United States Patent
Izawa

(10) Patent No.: US 9,344,620 B2
(45) Date of Patent: May 17, 2016

(54) IMAGING DEVICE AND METHOD FOR CONTROLLING SAME

(71) Applicant: FUJIFILM Corporation, Tokyo (JP)

(72) Inventor: Katsutoshi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/620,931

(22) Filed: Feb. 12, 2015

(65) Prior Publication Data

US 2015/0156405 A1 Jun. 4, 2015

Related U.S. Application Data

(63) Continuation of application No. PCT/JP2013/074830, filed on Sep. 13, 2013.

(30) Foreign Application Priority Data

Sep. 19, 2012 (JP) .................... 2012-205743

(51) Int. Cl.
*H04N 5/232* (2006.01)
*G02B 7/34* (2006.01)
(Continued)

(52) U.S. Cl.
CPC .............. *H04N 5/23212* (2013.01); *G02B 7/34* (2013.01); *H04N 5/217* (2013.01); *H04N 5/232* (2013.01); *H04N 5/23293* (2013.01); *H04N 5/365* (2013.01); *H04N 5/369* (2013.01); *H04N 5/3696* (2013.01); *G03B 13/36* (2013.01); *G03B 17/18* (2013.01); *H04N 9/07* (2013.01)

(58) Field of Classification Search
CPC .......... H04N 5/23212; H04N 5/3675

USPC ................................................. 348/246, 345
See application file for complete search history.

(56) References Cited

U.S. PATENT DOCUMENTS 6,829,008 B1    12/2004   Kondo et al.
9,001,262 B2 *   4/2015   Onuki ................ H04N 5/23212
                                                 348/222.1
(Continued)

FOREIGN PATENT DOCUMENTS

JP    2000-156823 A    6/2000
JP    2009-147665 A    7/2009
(Continued)

OTHER PUBLICATIONS

International Search Report, mailed Dec. 17, 2013, issued in PCT/JP2013/074830.
(Continued)

*Primary Examiner* — Roberto Velez
*Assistant Examiner* — Cynthia Segura
(74) *Attorney, Agent, or Firm* — Birch, Stewart, Kolasch & Birch, LLP

(57) ABSTRACT

An imaging device comprising a photographing lens, an imaging element; a first interpolation device, a second interpolation device, a focusing confirmation image generation device configured to at least generate a first image and a second image respectively from the pixel values of the first and second interpolation pixels calculated by the first and second interpolation device and generating a focusing confirmation image based on the first and second images, and a display device configured to display the focusing confirmation image generated by the focusing confirmation image generation device.

11 Claims, 26 Drawing Sheets

(51) Int. Cl.
    *H04N 5/369*   (2011.01)
    *H04N 5/365*   (2011.01)
    *H04N 5/217*   (2011.01)
    *G03B 13/36*   (2006.01)
    *H04N 9/07*    (2006.01)
    *G03B 17/18*   (2006.01)

(56) References Cited

U.S. PATENT DOCUMENTS

| | | | |
|---|---|---|---|
| 9,167,153 B2* | 10/2015 | Kawai | G02B 7/34 |
| 2006/0044409 A1* | 3/2006 | Aoki | H04N 9/646 |
| | | | 348/222.1 |
| 2009/0153693 A1 | 6/2009 | Onuki et al. | |
| 2009/0214132 A1* | 8/2009 | Yamada | G06K 9/4609 |
| | | | 382/266 |
| 2011/0001858 A1* | 1/2011 | Shintani | G02B 7/28 |
| | | | 348/294 |
| 2012/0154637 A1* | 6/2012 | Hara | H04N 5/23212 |
| | | | 348/239 |
| 2015/0062374 A1* | 3/2015 | Okazawa | G02B 7/34 |
| | | | 348/229.1 |
| 2015/0103210 A1* | 4/2015 | Inoue | G02B 7/346 |
| | | | 348/239 |

FOREIGN PATENT DOCUMENTS

| | | |
|---|---|---|
| JP | 2009-276426 A | 11/2009 |
| JP | 2010-243772 A | 10/2010 |
| JP | 2011-176714 A | 9/2011 |
| JP | 2011-250325 A | 12/2011 |

OTHER PUBLICATIONS

Written Opinion of the International Searching Authority, mailed Dec. 17, 2013, issued in PCT/JP2013/074830.

* cited by examiner

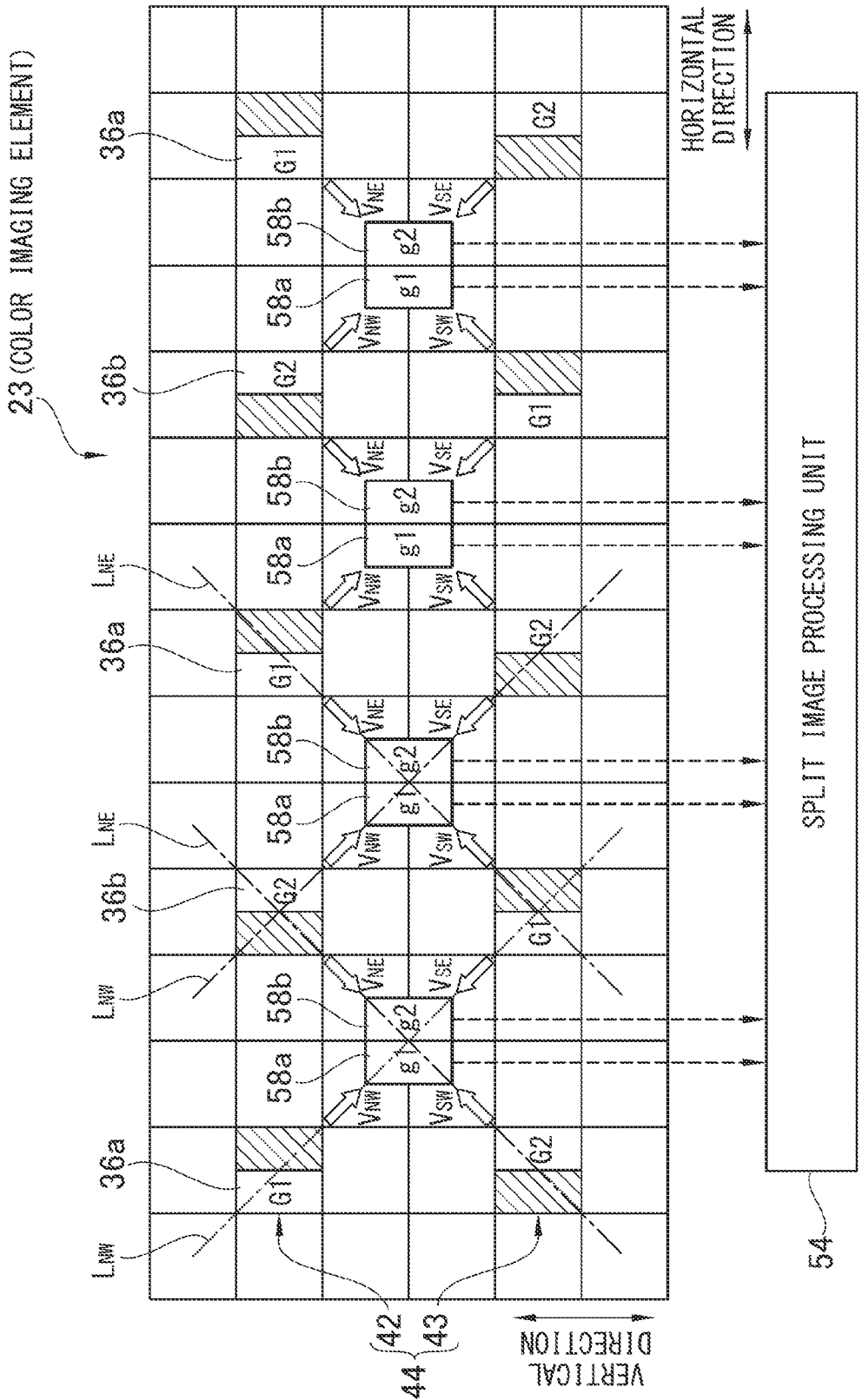

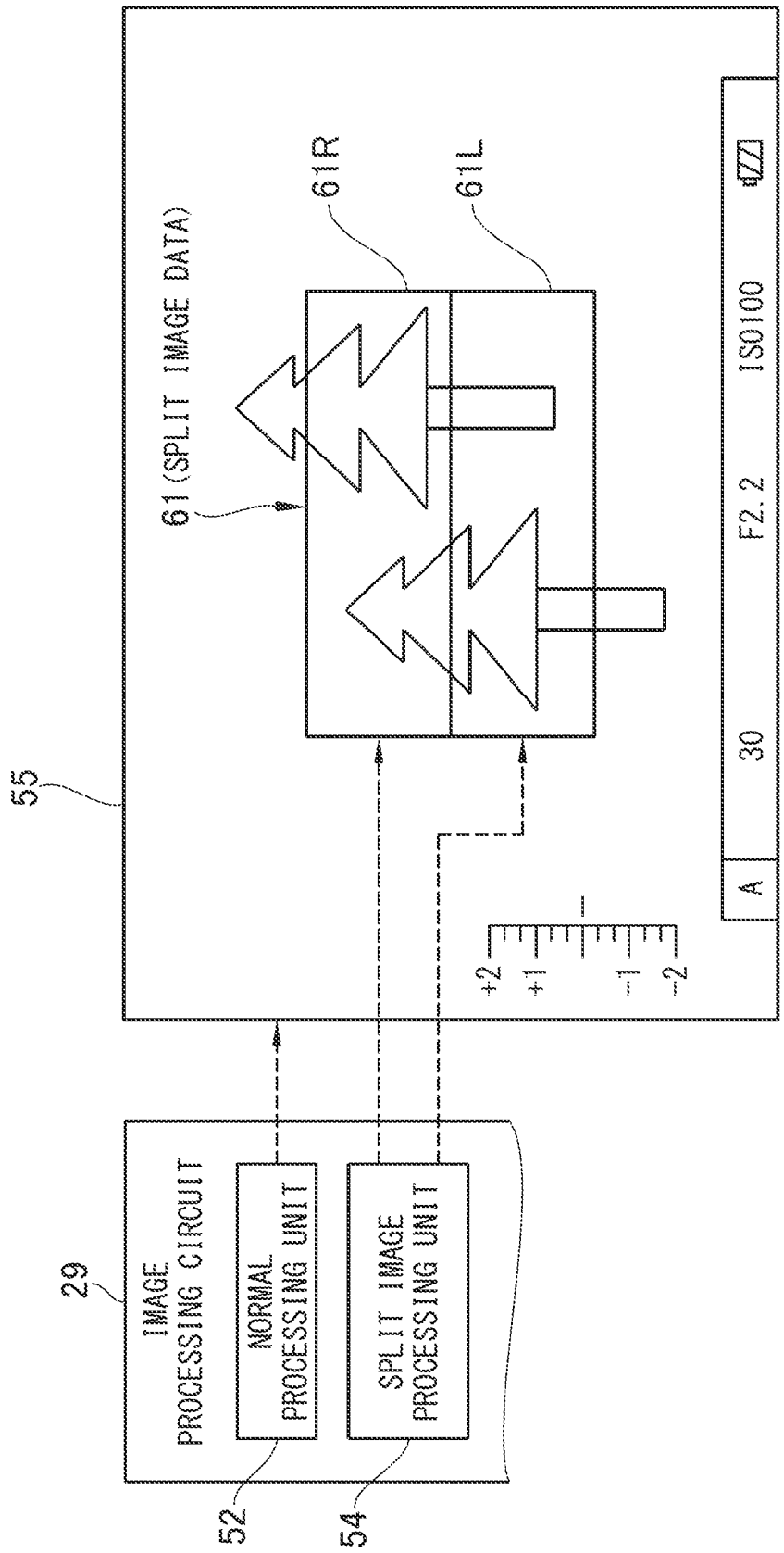

IMAGING DEVICE AND METHOD FOR CONTROLLING SAME

CROSS-REFERENCE TO RELATED APPLICATIONS

This application is a Continuation of PCT International Application No. PCT/JP2013/074830 filed on Sep. 13, 2013, which claims priority under 35 U.S.C §119(a) to Japanese Patent Application No. 2012-205743 filed on Sep. 19, 2012. Each of the above application(s) is hereby expressly incorporated by reference, in its entirety, into the present application.

BACKGROUND OF THE INVENTION

1. Field of the Invention

The present invention relates to an imaging device that generates and displays a focusing confirmation image for focusing confirmation and a control method thereof.

2. Description of the Related Art

There is a digital camera including a so-called manual focus mode in which the user can manually perform focus adjustment, besides automatic focus using a phase difference detection system or the like described in PTLs 1 and 2, for example. Further, there is known a digital camera that displays a split image in a live view image (which is also called a through image) to facilitate work that a photographer performs focusing on an object at the time of this manual focus mode (see PTLs 3 and 4).

The split image is vertically divided, the upper and lower images of the split image are horizontally shifted at the time of defocus, and the upper and lower images are not horizontally shifted in a focus state. By this means, the photographer can perform focusing by performing focus operation such that the upper and lower images of the split image are not horizontally shifted.

As illustrated in FIG. 26, a digital camera that can display a split image includes a color imaging element 100 in which normal pixels for photographing (whose illustration is omitted) and two kinds of phase difference pixels G1 and G2 that receive pupil-divided object light are two-dimensionally arrayed on the imaging surface. On this imaging surface, a pair of sequence patterns Q3 having first array pattern Q1 and second array pattern Q2 in which phase difference pixels G1 and G2 are arrayed at regular intervals in the horizontal direction respectively are arrayed at regular intervals in the vertical direction. The digital camera having the color imaging element 100 generates a photographing image on the basis of an output signal from the normal pixel and performs live view image display while generating a split image on the basis of respective output signals (pixel values) of two kinds of phase difference pixels and performing display in a live view image.

However, in the color imaging element 100, phase difference pixels G1 and G2 are disposed in the same pixel line in the vertical direction respectively but phase difference pixels G1 and G2 are not disposed in the same pixel line in the horizontal direction. Therefore, in a case where the color imaging element 100 takes an image of a horizontal high-frequency object as illustrated in FIGS. 27A and 27B, the boundary and gap between upper and lower images of a split image are clearly displayed. Meanwhile, in a case where the color imaging element 100 takes an image of a vertical high-frequency object as illustrated in FIGS. 28A and 28B, since the boundary and gap between upper and lower images of a split image are not clearly displayed, there is a risk that the focusing accuracy decreases.

Therefore, as illustrated in FIG. 29 and FIG. 30, in a color imaging element 102 described in PTLs 3 and 4, one of phase difference pixels G1 and G2 is disposed in a W-shaped manner on the imaging surface and the other is disposed in an M-shaped manner. By this means, phase difference pixels G1 and G2 are disposed in the same pixel line in the vertical direction respectively and also disposed in the same pixel line in the horizontal direction.

When a split image is generated on the basis of output signals of phase difference pixels G1 and G2 of such array patterns, it is general to generate the split image with an assumption that the pixel arrays of phase difference pixels G1 and G2 are linear arrays as illustrated in FIG. 26. In this case, a pixel located between phase difference pixels G1 is assumed to be interpolation pixel g1, and the pixel value of this interpolation pixel g1 is calculated by pixel interpolation according to arrows $V_T$ and $V_B$. Moreover, the pixel value of interpolation pixel g2 located between phase difference pixels G2 is calculated by pixel interpolation according to arrows $V_T$ and $V_B$. Further, the split image is generated on the basis of the pixel values of respective phase difference pixels G1 and G2 and the pixel values of interpolation pixels g1 and g2.

Moreover, as shown by arrows $V_T$ and $V_B$, there is also a method of performing interpolation processing by the use of the pixel values of phase difference pixels G1 and G2 located on the left side and right side of interpolation pixels g1 and g2 in the figure instead of performing interpolation processing by the use of the pixel values of phase difference pixels G1 and G2 located on the upper side and lower side of interpolation pixels g1 and g2 in the figure. That is, the pixel values of interpolation pixels g1 and g2 are calculated by performing pixel interpolation according to arrows $V_R$ and $V_L$ respectively. Even in this case, a split image is generated on the basis of the pixel values of respective phase difference pixels G1 and G2 and the pixel values of interpolation pixels g1 and g2.

Since phase difference pixels G1 and G2 are disposed in the same pixel lines in the vertical direction and horizontal direction in the color imaging element 102, when a vertical high-frequency object is imaged, the boundary and gap between upper and lower images of a split image are displayed more clearly than when it is imaged by the above-mentioned color imaging element 100. As a result, it is possible to improve the focusing accuracy more than a case where the color imaging element is used.

CITATION LIST

Patent Literature

{PTL 1}: Japanese Patent Application Laid-Open No. 2011-176714
{PTL 2}: Japanese Patent Application Laid-Open No. 2010-243772
{PTL 3}: Japanese Patent Application Laid-Open No. 2000-156823
{PTL 4}: Japanese Patent Application Laid-Open No. 2009-276426

SUMMARY OF THE INVENTION

However, in the color imaging element 102 illustrated in FIG. 29 and FIG. 30, a state where interpolation is not required by using the pixel values of phase difference pixels G1 and G2 as they are and a state where interpolation has to be performed on the basis of the pixel values of phase difference pixels G1 and G2 located in positions separated by three pixels are switched. At this time, jaggies are likely to occur in a case where interpolation processing is performed on the basis of the pixel values of phase difference pixels G1 and G2 located in the separate positions. Therefore, in a case where the color imaging element 102 is used, there is a risk that the focusing accuracy of a split image decreases due to the occurrence of the jaggies. Moreover, in a case where pixel interpolation processing is performed in the vertical direction, a blur is likely to occur in a vertical high-frequency signal when a vertical high-frequency object is imaged, and, in a case where the pixel interpolation processing is performed in the horizontal direction, a blur is likely to occur in a horizontal high-frequency signal when a horizontal high-frequency object is imaged.

It is an object of the present invention to provide an imaging device that can achieve both jaggy reduction and focusing accuracy improvement, and a control method thereof.

An imaging device to achieve the object of the present invention includes: a photographing lens; an imaging element where multiple pixels including a photoelectric conversion element are two-dimensionally arrayed in a first direction and a second direction perpendicular to the first direction, the multiple pixels including a first pixel and a second pixel in which each object light passing through a first region and a second region of the photographing lens is pupil-divided and respectively enters, and a pair of array patterns including a first array pattern formed by alternately arraying the first and second pixels at first intervals in the first direction and a second array pattern formed by shifting the first array pattern in the first direction by the first interval are repeatedly disposed at second intervals in the second direction; a first interpolation device configured to calculate a pixel value of a first interpolation pixel in an intermediate position of a first pixel pair based on a pixel value of the first pixel pair by interpolation processing when the first pixels of the first and second array patterns disposed in a same pixel line among pixel lines in a third direction and a fourth direction that are inclined to the first and second directions of the imaging element are assumed to be the first pixel pair; a second interpolation device configured to calculate a pixel value of a second interpolation pixel in an intermediate position of a second pixel pair based on a pixel value of the second pixel pair by interpolation processing when the second pixels of the first and second array patterns disposed in the same pixel line are assumed to be the second pixel pair; a focusing confirmation image generation device configured to at least generate a first image and a second image respectively from the pixel values of the first and second interpolation pixels calculated by the first and second interpolation device and generating a focusing confirmation image based on the first and second images; and a display device configured to display the focusing confirmation image generated by the focusing confirmation image generation device.

According to the present invention, as compared with a case where interpolation processing is performed in the horizontal direction or the vertical direction, it is possible to calculate the pixel values of the first and second interpolation pixels respectively on the basis of the pixel values of the first and second pixels that always exist in close positions.

It is preferable that the focusing confirmation image generation device generates the focusing confirmation image based on only the pixel values of the first and second pixels calculated by the first and second interpolation device. The focusing confirmation image in which jaggies and blur are reduced is acquired.

It is preferable that the multiple pixels include the first and second pixels and a third pixel in which each object light passing through the first and second regions respectively enters without pupil division, further including: a third image generation device configured to generate a third image based on a pixel value of the third pixel; and a display control device configured to cause the display device to display the third image generated by the third image generation device and display the focusing confirmation image in a display region of the third image. By this means, it is possible to perform focus operation while viewing the third image.

It is preferable to include a third interpolation device configured to decide a pixel value of a third interpolation pixel located between the first pixels of the first and second array patterns, based on pixel values of these first pixels, and deciding a pixel value of a fourth interpolation pixel located between the second pixels, based on pixel values of these second pixels; a fourth interpolation device configured to decide a pixel value of a fifth interpolation pixel located between the first pixels of one of the first and second array patterns, based on pixel values of the first pixels disposed in a same pixel line in the second direction as the fifth interpolation pixel, and deciding a pixel value of a sixth interpolation pixel located between the second pixels of the one of the first and second array patterns, based on pixel values of the second pixels disposed in a same pixel line in the second direction as the sixth interpolation pixel; a determination device configured to determine a direction with high correlation of the third pixel and intensity of the correlation, based on the pixel value of the third pixel; and an interpolation control device configured to select what corresponds to the determination result from the first and second interpolation device, the third interpolation device and the fourth interpolation device, based on the determination result of the determination device, to cause interpolation processing to be performed. By this means, even in a case where signal correlation in the first direction or the second direction is extremely strong, it is possible to suppress the occurrence of blur and jaggies of the focusing confirmation image.

It is preferable that the second array pattern is disposed by being separated by the first interval in the second direction with respect to the first array pattern. By this means, the third direction and the fourth direction are set to directions inclined by ±45° with respect to the first direction and the second direction respectively.

It is preferable to further include a defect pixel detection device configured to detect a defect pixel included in the multiple pixels, where: based on a detection result of the defect pixel detection device, when one of the first pixel pair is the defect pixel, the first interpolation device decides a pixel value of the other of the first pixel pair as a pixel value of the first interpolation pixel; and, based on the detection result of the defect pixel detection device, when one of the second pixel pair is the defect pixel, the second interpolation device decides a pixel value of the other of the second pixel pair as a pixel value of the first interpolation pixel. By this means, even if the first and the second pixel are defect pixels, it is possible to prevent the occurrence of blur and jaggies of the focusing confirmation image.

It is preferable that: based on the detection result of the defect pixel detection device, when both of the first pixel pair disposed in an N-th (N is a natural number equal to or greater than 2) place along the first direction are the defect pixel, the first interpolation device calculates pixel values of the first interpolation pixels respectively corresponding to the first pixel pairs of a (N−1)-th place and a (N+1)-th place, and decides an average value of the pixel values of these first interpolation pixels as a pixel value of the first interpolation pixel corresponding to the first pixel pair of the N-th place; and, based on the detection result of the defect pixel detection device, when both of the second pixel pair disposed in the N-th place are the defect pixel, the second interpolation device calculates pixel values of the second interpolation pixels respectively corresponding to the second pixel pairs of the (N−1)-th place and the (N+1)-th place, and decides an average value of the pixel values of these second interpolation pixels as a pixel value of the second interpolation pixel corresponding to the second pixel pair of the N-th place. By this means, even if the first and the second pixels are defect pixels, it is possible to prevent the occurrence of blur and jaggies of the focusing confirmation image.

It is preferable that the first region and the second region of the photographing lens are regions symmetrical to a first straight line parallel to the second direction.

It is preferable that the focusing confirmation image is an image formed by arranging and disposing the first image and the second image in the second direction.

It is preferable that: the photographing lens includes a focus lens; and a lens movement mechanism to move the focus lens in an optical axis direction of the photographing lens in response to manual focus operation.

Moreover, a control method of an imaging device of the present invention includes a photographing lens and an imaging element where multiple pixels including a photoelectric conversion element are two-dimensionally arrayed in a first direction and a second direction perpendicular to the first direction, the multiple pixels including a first pixel and a second pixel in which each object light passing through a first region and a second region of the photographing lens is pupil-divided and respectively enters, and a pair of array patterns including a first array pattern formed by alternately arraying the first and second pixels at first intervals in the first direction and a second array pattern formed by shifting the first array pattern in the first direction by the first interval are repeatedly disposed at second intervals in the second direction, and the method includes: a first interpolation step of calculating a pixel value of a first interpolation pixel in an intermediate position of a first pixel pair based on a pixel value of the first pixel pair by interpolation processing when the first pixels of the first and second array patterns disposed in a same pixel line among pixel lines in a third direction and a fourth direction that are inclined to the first and second directions of the imaging element are assumed to be the first pixel pair; a second interpolation step of calculating a pixel value of a second interpolation pixel in an intermediate position of a second pixel pair based on a pixel value of the second pixel pair by interpolation processing when the second pixels of the first and second array patterns disposed in the same pixel line are assumed to be the second pixel pair; a focusing confirmation image generation step of at least generating a first image and a second image respectively from the pixel values of the first and second interpolation pixels calculated in the first and second interpolation steps and generating a focusing confirmation image based on the first and second images; and a display step of displaying the focusing confirmation image generated in the focusing confirmation image generation step.

In the imaging device and control method of the present invention, since the pixel values of the first and second interpolation pixels are calculated on the basis of the pixel values of the first and second pixel pairs disposed in the same pixel line among pixel lines in the third direction and the fourth direction which are inclined to the first and second directions of the imaging element, as compared with a case where interpolation processing is performed in the horizontal direction or the vertical direction, it is possible to calculate the pixel values of the first and second interpolation pixels respectively on the basis of the pixel values of the first and second pixels that always exist in close positions. By this means, it is possible to reduce the occurrence of jaggies when a high-frequency object is imaged. Moreover, it is possible to reduce the blur of an imaged signal when the high-frequency object is imaged. As a result, since the boundary and gap of a focusing confirmation image are clearly displayed, it is possible to improve the focusing accuracy.

BRIEF DESCRIPTION OF THE DRAWINGS

FIG. 9 is an explanatory diagram to describe pixel interpolation processing in the oblique direction.

FIG. 12 is an explanatory diagram to describe split image data.

DETAILED DESCRIPTION OF THE PREFERRED EMBODIMENTS

[Digital Camera of First Embodiment]

Figure 1:
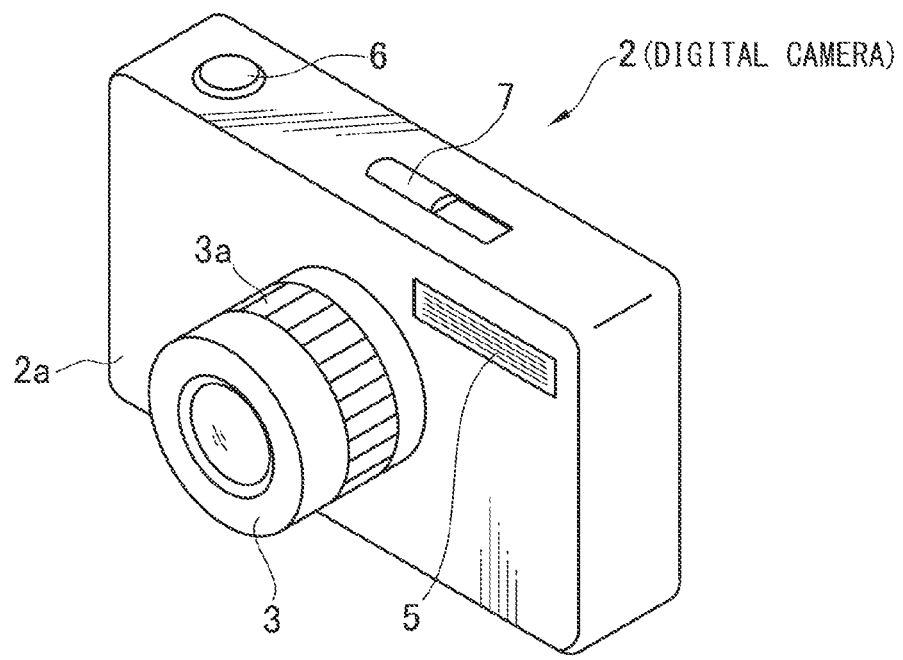
FIG. 1 is a front perspective view of a digital camera.

As illustrated in FIG. 1, a digital camera 2 corresponds to an imaging device of the present invention. A lens barrel 3 and a stroboscopic light emission unit 5, and so on, are installed on the front surface of a camera main body 2a of this digital camera 2. A shutter button 6 and a power supply switch 7, and so on, are installed on the upper surface of the camera main body 2a. A focus ring (lens movement mechanism) 3a used for manual focus (which is simply referred to as "MF" below) operation is rotatably attached to the outer peripheral surface of the lens barrel 3.

Figure 2:
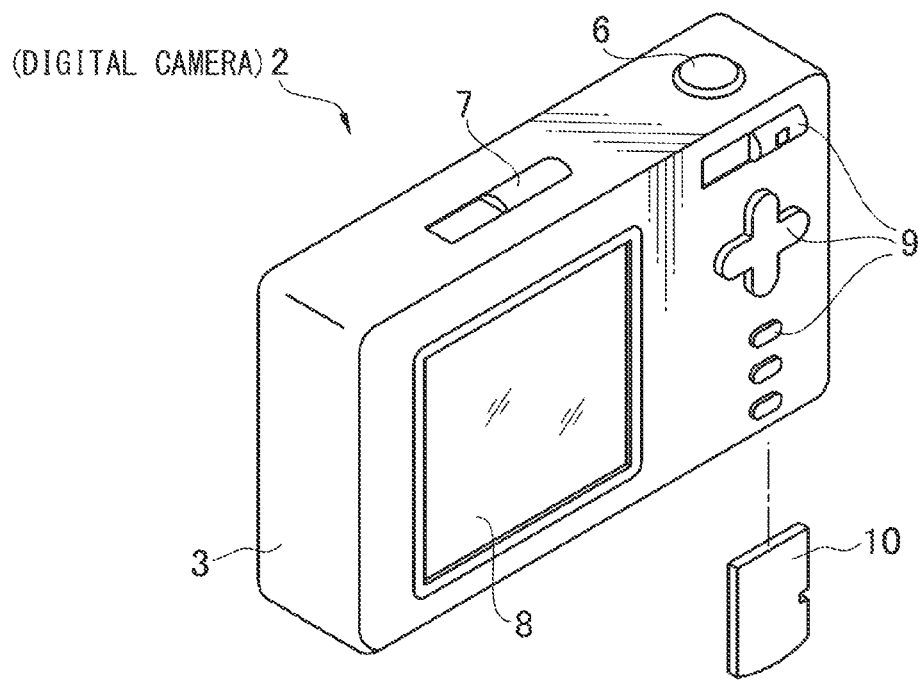
FIG. 2 is a back perspective view of a digital camera.

As illustrated in FIG. 2, a display unit (display device) 8 and an operation unit 9 are installed on the back surface of the camera main body 2a. The display unit 8 functions as an electronic viewfinder in a photographing standby state and displays a live view image (which is also referred to as "through image"). Moreover, in the display unit 8 at the time of image reproduction, an image is reproduced and displayed on the basis of image data recorded in a memory card 10.

The operation unit 9 is formed with a mode switching switch, a cross key and an execution key, and so on. The mode switching switch is operated when the operation mode of the digital camera 2 is switched. The digital camera 2 has a photographing mode that takes an image of an object and acquires a photographing image, and a reproduction mode that reproduces and displays the photographing image, and so on. Moreover, the photographing mode includes an AF mode to perform automatic focus (hereinafter simply referred to as "AF") and an MF mode to perform MF operation.

The cross key and the execution key are operated when: a menu screen and a setting screen are displayed on the display unit 8; a cursor displayed in these menu screen and setting screen is moved; and various settings of the digital camera 2 are fixed.

A card slot to which the memory card 10 is loaded and a loading lid that opens and closes the opening of this card slot are installed on the bottom surface of the camera main body 2a though illustration thereof is omitted.

Figure 3:
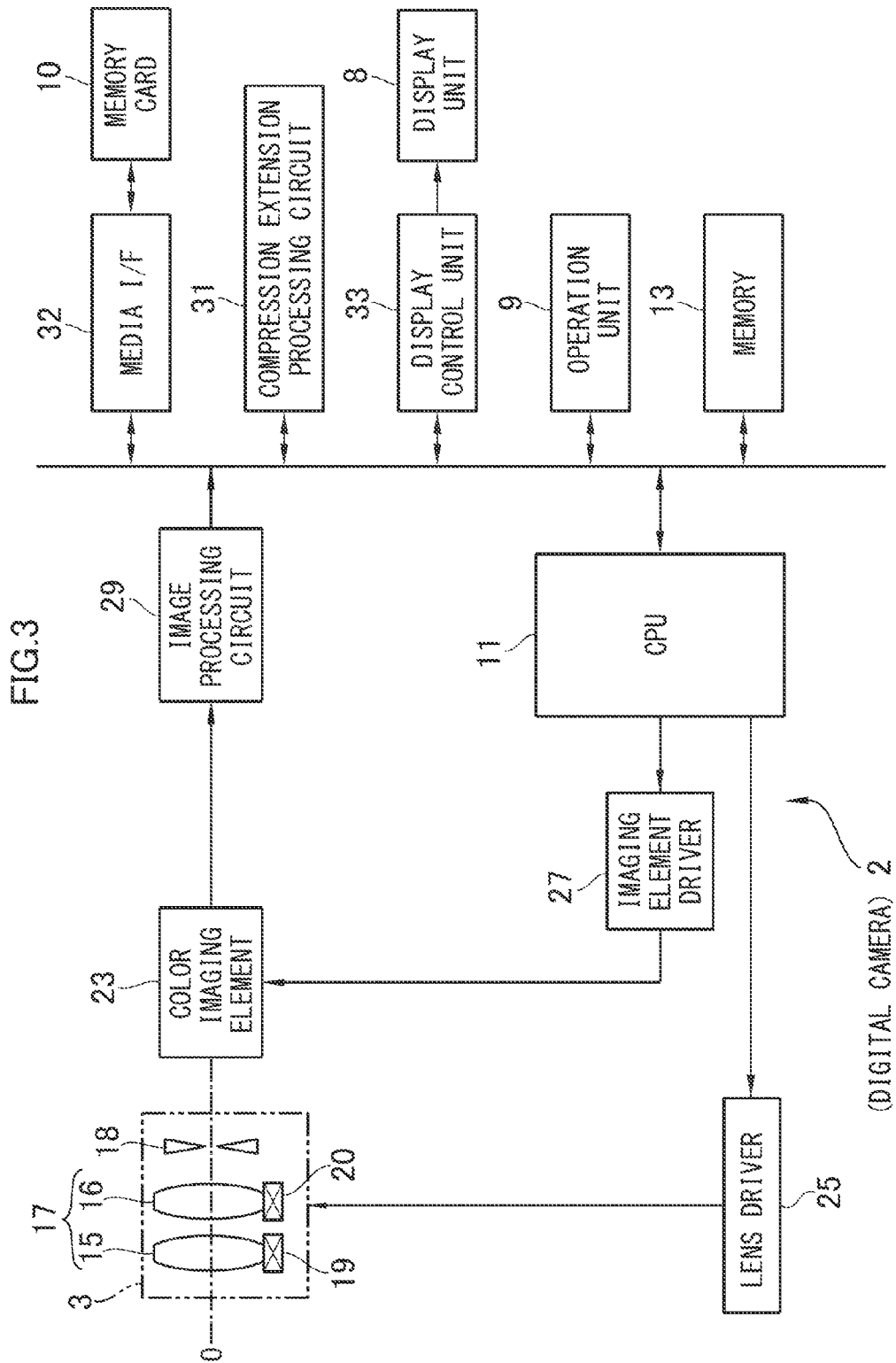
FIG. 3 is a block diagram illustrating an electrical configuration of a digital camera.

As illustrated in FIG. 3, a CPU 11 of the digital camera 2 sequentially executes various kinds of programs and data read out from a memory 13 on the basis of a control signal from the operation unit 9, and integrally controls each part of the digital camera 2. Here, the RAM region of the memory 13 functions as a work memory in which the CPU 11 performs processing, or temporary storage destination of various kinds of data.

A photographing lens 17 including a zoom lens 15 and a focus lens 16, and a mechanical shutter 18, and so on, are incorporated in the lens barrel 3. The zoom lens 15 and the focus lens 16 are driven by a zoom mechanism 19 and a focus mechanism 20 respectively and moved back and forth along optical axis O of the photographing lens 17. The zoom mechanism 19 and the focus mechanism 20 are configured with a gear and a motor, and so on. Moreover, the focus mechanism 20 is connected with the focus ring 3a through an unillustrated gear. Therefore, the focus mechanism 20 moves the focus lens 16 along the direction of optical axis O (hereafter referred to as "optical axis direction") according to the rotation operation (manual focus operation of the present invention) of the focus ring 3a at the MF mode.

The mechanical shutter 18 has a moving element (whose illustration is omitted) that moves between a closing position that prevents object light from entering into a color imaging element 23 and an opening position that allows the object light to enter. The mechanical shutter 18 opens/blocks an optical path from the photographing lens 17 to the color imaging element 23 by moving the moving element to each position. Moreover, the mechanical shutter 18 includes a diaphragm that controls the light quantity of object light entered into the color imaging element 23. The mechanical shutter 18, the zoom mechanism 19 and the focus mechanism 20 are subjected to operation control by the CPU 11 through a lens driver 25.

The color imaging element 23 is disposed behind the mechanical shutter 18. The color imaging element 23 converts the object light having passed the photographing lens 17, and so on, into an electrical output signal and outputs it. Here, as the color imaging element 23, it is possible to use various kinds of imaging elements such as a CCD (Charge Coupled Device) imaging element and a CMOS (Complementary Metal Oxide Semiconductor) imaging element. An imaging element driver 27 controls the drive of the color imaging element 23 under the control of the CPU 11.

An image processing circuit 29 generates photographing image data by applying various kinds of processing such as gradation conversion, white balance correction and γ correction processing to the output signal from the color imaging element 23. Moreover, the image processing circuit 29 generates split image data for MF operation besides the photographing image data at the MF mode. The photographing image data and the split image data are temporarily stored in the VRAM region of the memory 13 (it is acceptable if a VRAM is separately installed). The VRAM region has a live view image memory area that stores an image of two consecutive fields, and sequentially overwrites and stores the photographing image data and the split image data.

A compression extension processing circuit 31 performs compression processing on the photographing image data stored in the VRAM region when the shutter button 6 is subjected to press operation. Moreover, the compression extension processing circuit 31 applies extension processing to compressed image data acquired from the memory card 10 through a media I/F 32. The media I/F 32 performs recording and reading, and so on, of photographing image data with respect to the memory card 10.

At the photographing mode, a display control unit 33 reads out the photographing image data and split image data stored in the VRAM region and outputs them to the display unit 8. Moreover, at the reproduction mode, the display control unit 33 outputs photographing image data extended in the compression extension processing circuit 31 to the display unit 8.

<Configuration of Color Imaging Element>

Figure 4:
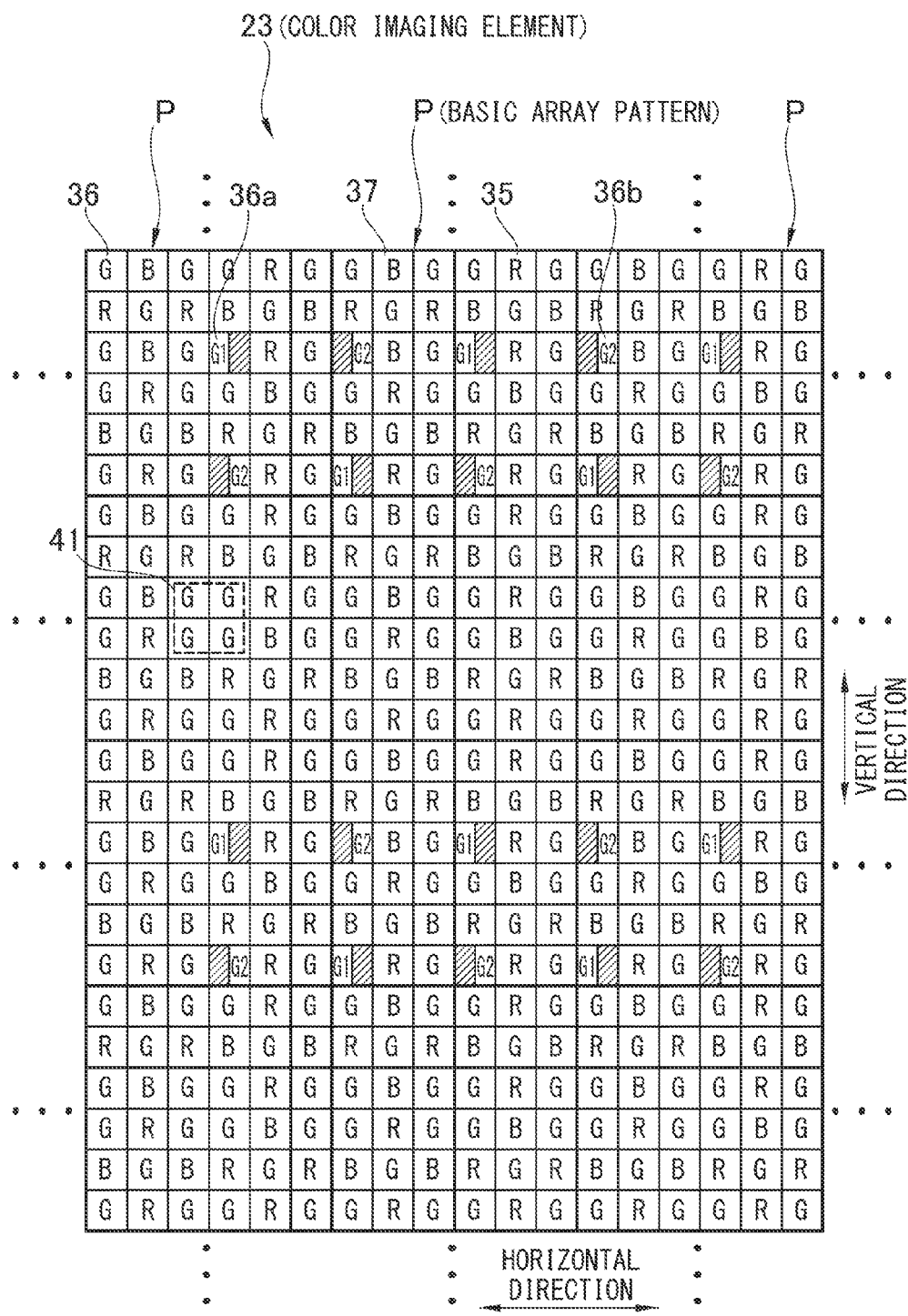
FIG. 4 is a front view of a color imaging element.

As illustrated in FIG. 4, on the imaging surface of the color imaging element 23, an R pixel 35 of red (R), a G pixel 36 of green (G) and a B pixel 37 of blue (B) are two-dimensionally disposed. RGB pixels 35 to 37 correspond to the third pixel of the present invention and are formed including a photoelectric conversion element 39 (see FIG. 6) and a color filter 40 of any of three primary colors disposed above the photoelectric conversion element 39 (see FIG. 6). Color filters 40 of the R color, G color and B color are installed on respective photoelectric conversion elements 39 of the R pixel 35, G pixel 36 and B pixel 37. Here, "on" and "above" indicate the direction from a semiconductor substrate 45 to a microlens 49 in FIG. 6 (upper direction in the figure).

The color filter array (pixel array) of the color imaging element 23 has following features (1), (2), (3), (4), (5) and (6).

[Feature (1)]

The color filter array includes basic array pattern P formed with a square array pattern corresponding to 6×6 pixels, and this basic array pattern P is repeatedly disposed in the horizontal direction and the vertical direction. Since the color filters 40 of RGB are arrayed with predetermined periodicity in this way, as compared with a known random array in the related art, it is possible to perform processing according to a repetitive pattern when pixel interpolation processing (which may be referred to as "synchronization processing" or "demosaicing processing") or the like of R, G, and B signals read out from the color imaging element 23 is performed. Moreover, in a case where an image is reduced by thinning processing in units of basic array pattern P, it is possible to use a common processing circuit by making a color filter array after the thinning processing identical to a color filter array before the thinning processing.

[Feature (2)]

As for the color filter array, one or more color filters of the G color corresponding to a color that contributes most to acquire a luminance signal (G color in this embodiment) are disposed in respective filter lines in the horizontal, vertical and oblique (oblique upper right and oblique lower left directions and oblique lower right and oblique upper left directions) directions of the color filter array. By this means, it is possible to improve the reproduction accuracy of pixel interpolation processing in a high frequency region.

[Feature (3)]

As for basic array pattern P, the percentage of the pixel number of the G pixel 36 is larger than the percentages of respective pixel numbers of the R pixel 35 and B pixel 37 of other colors. By this means, aliasing at the time of pixel interpolation processing is suppressed and the high frequency reproducibility improves.

[Feature (4)]

As for the color filter array, one or more color filters 40 of the R color and B color corresponding to other colors of two or more colors than the G color (R and B colors in this embodiment) are disposed in respective lines in the horizontal and vertical directions of the color filter array in basic array pattern P. By this means, it is possible to reduce the occurrence of false colors (color moire). As a result, it is possible to prevent an optical low-pass filter to suppress the occurrence of false colors from being disposed in an optical path from the incident surface of the photographing lens 17 to the imaging surface, or, even in a case where the optical low-pass filter is applied, it is possible to apply the one whose function to cut the high frequency component to prevent the occurrence of false colors is weak. Therefore, it is possible not to deteriorate the resolution.

[Feature (5)]

The color filter array includes a square array 41 corresponding to 2×2 G pixels 36 in which the G color the color filter 40 is installed. By extracting such 2×2 G pixels 36 and calculating the difference absolute value of the pixel values of the G pixels 36 in the horizontal direction, the difference absolute value of the pixel values of the G pixels 36 in the vertical direction and the difference absolute value of the pixel values of the G pixels 36 in the oblique direction, it is possible to determine that there is a correlation in a direction in which the difference absolute value is small among the horizontal direction, the vertical direction and the oblique direction. That is, according to this color filter array, it is possible to determine a direction with a high correlation among the horizontal direction, the vertical direction and the oblique direction, by the use of information on the G pixels 36 of the minimum pixel interval in the square array 41. This direction determination result can be used for pixel interpolation processing.

[Feature (6)]

Basic array pattern P is point-symmetrical against the center. Moreover, four 3×3 subarrays in basic array pattern P are point-symmetrical against the color filter 40 of the G color at respective centers. By such symmetric property, it becomes possible to reduce and simplify the circuit size of a subsequent processing circuit.

[Phase Difference Pixel]

On a partial region (for example, central region) of the imaging surface of the color imaging element 23, a first phase difference pixel 36a (displayed with "G1" in the figure) and a second phase difference pixel 36b (displayed with "G2" in the figure) are installed instead of part of the G pixels 36. The first and second phase difference pixels 36a and 36b correspond to the first pixel and second pixel of the present invention.

Figure 5:
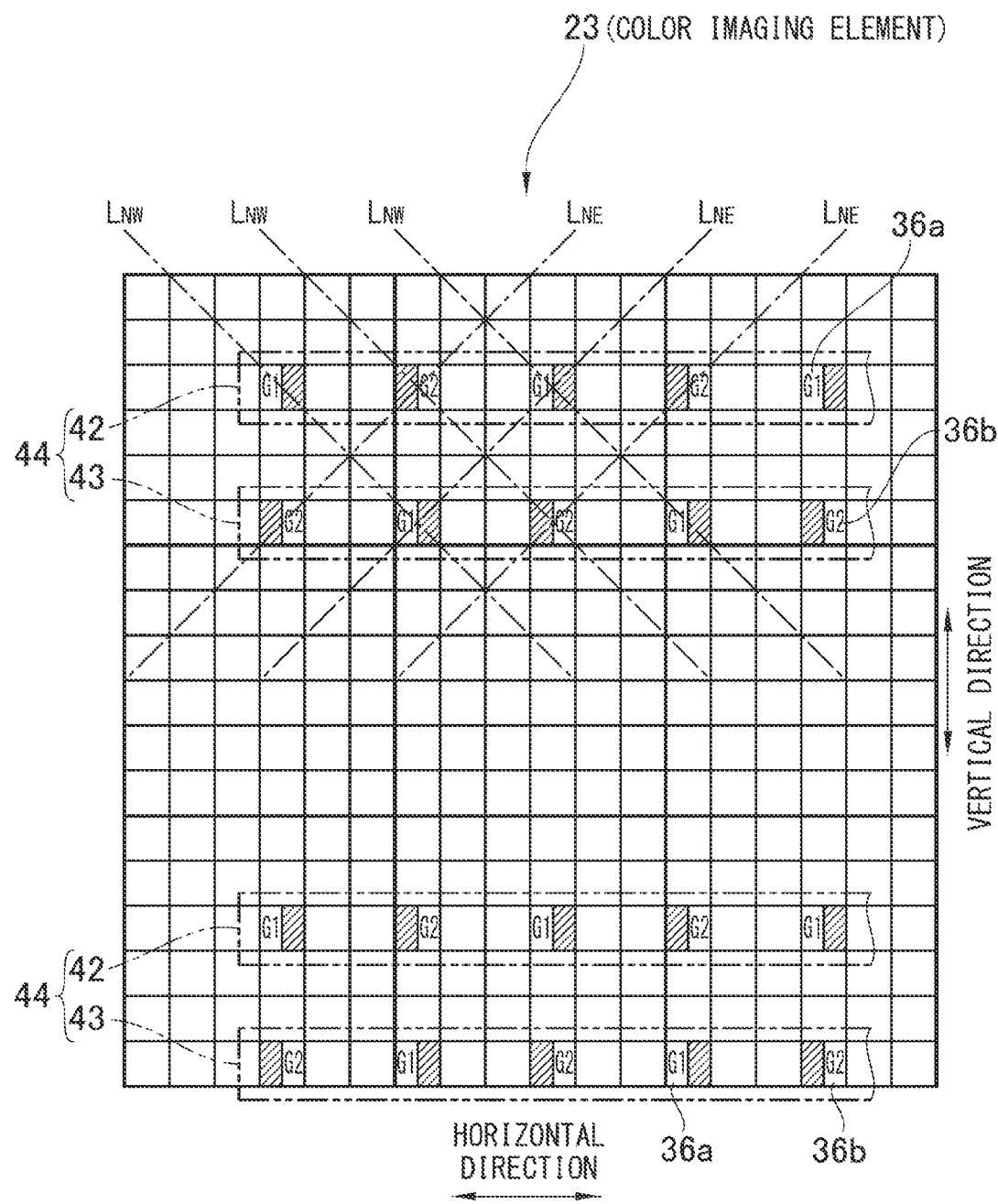
FIG. 5 is an explanatory diagram to describe the array of the first and second phase difference pixels.

As illustrated in FIG. 5, a pair of array patterns 44 having a first array pattern 42 and a second array pattern 43 are installed on the imaging surface of the color imaging element 23. In the first array pattern 42, the first phase difference pixel 36a and the second phase difference pixel 36b are alternately arrayed at three-pixel intervals (first interval) in the horizontal direction (first direction). The second array pattern 43 is formed by shifting the first array pattern 42 by three-pixel interval in the horizontal direction.

In such a pair of array patterns 44, the first phase difference pixels 36a are disposed in a W-shaped manner and the second phase difference pixels 36b are disposed in an M-shaped manner. By this means, the first phase difference pixels 36a of the first and second array patterns 42 and 43 are disposed in the same pixel lines in pixel lines $L_{NE}$ and $L_{NW}$ in the oblique (NE, NW) directions inclined with respect to the horizontal and vertical directions of the imaging surface of the color imaging element 23. Moreover, the second phase difference pixels 36b of the first and second array patterns 42 and 43 are disposed in the same pixel lines in pixel lines $L_{NE}$ and $L_{NW}$.

Here, since the RGB pixels 35 to 37 and the first and second phase difference pixels 36a and 36b are a square shape, the NE direction and the NW direction are directions of 45° with respect to the horizontal direction and the vertical direction respectively. This angle may increase or decrease according to the increase or decrease of the length of each side in the horizontal direction or vertical direction of each pixel. For example, in a case where pixels of a rectangular shape different from a square shape are used, the diagonal direction thereof becomes oblique (NE and NW directions). Moreover, even if each pixel is a rectangular shape different from the square shape, in a case where each pixel is disposed in a square lattice shape, the NE direction and the NW direction are directions of 45° with respect to the horizontal direction and the vertical direction respectively.

Such a pair of array patterns 44 are repeatedly disposed at 12-pixel intervals (second interval) in the vertical direction (second direction).

Figure 6:
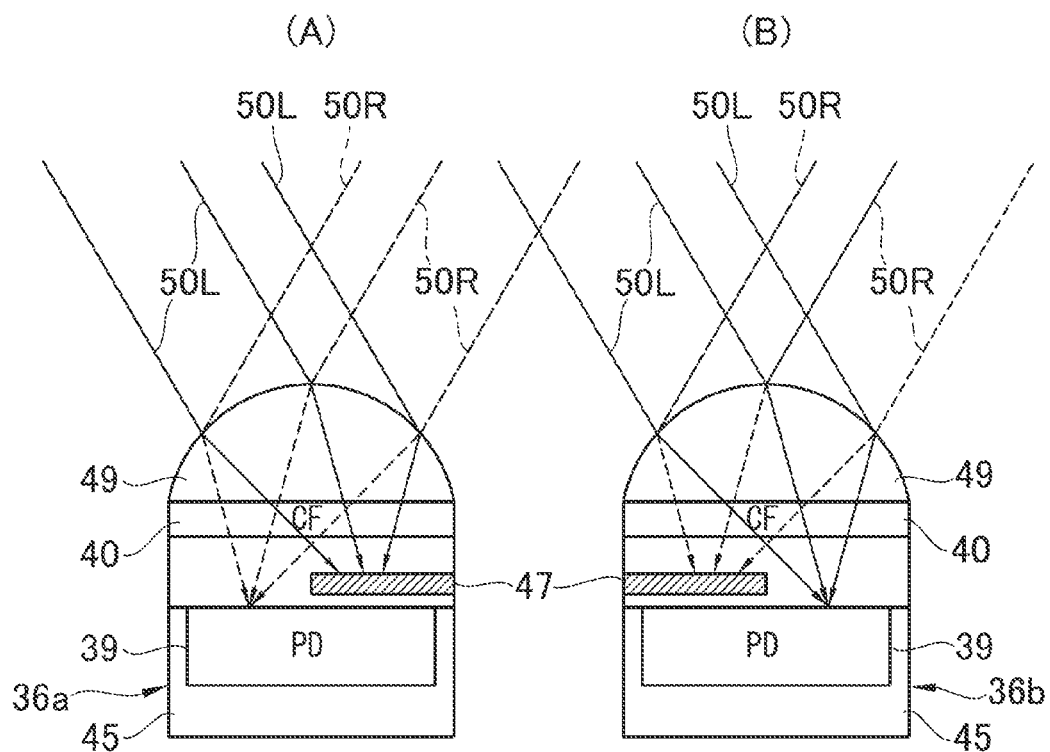
FIG. 6 is a cross-sectional view of the first and second phase difference pixels.

In parts (A) and (B) of FIG. 6 in which the cross sections of the first and second phase difference pixels 36a and 36b are illustrated, the photoelectric conversion element 39 is formed in a matrix manner on the surface layer of the semiconductor substrate 45 of the color imaging element 23. Here, various circuits used for the drive or signal output of each pixel are installed in the semiconductor substrate 45 though illustration thereof is omitted.

A light shielding film 47 is installed on each photoelectric conversion element 39. The light shielding film 47 is installed so as to cover the right half region (which is simply referred to as "right region" below) of the photoelectric conversion element 39 of the first phase difference pixel 36a in the figure and cover the left half region (which is simply referred to as "left region" below) in the second phase difference pixel 36b in the figure. By this means, only the left region of the photoelectric conversion element 39 of the first phase difference pixel 36a is exposed and only the right region of the photoelectric conversion element 39 of the second phase difference pixel 36b is exposed. Here, the light shielding film 47 is not installed on the photoelectric conversion elements 39 of the RGB pixels 35 to 37 though illustration thereof is omitted.

The color filter 40 is installed on the light shielding film 47 through an unillustrated flattening layer, and so on. The color filter 40 of the G color is installed in positions corresponding to the first and second phase difference pixels 36a and 36b. Moreover, the color filters 40 of respective colors of R, G and B are installed in positions respectively corresponding to the pixels 35 to 37 of respective colors of R, G and B though illustration thereof is omitted.

The microlens 49 is installed on the color filters 40 of respective colors. Here, various layers such as a flat layer with transmittance may be installed between the color filter 40 and the microlens 49.

Object light 50R (displayed with dotted lines in the figure) that enters into the microlens 49 on the first phase difference pixel 36a from the right oblique direction in the figure is concentrated on the left region of the photoelectric conversion element 39 by the microlens 49. By contrast, since object light 50L (displayed with solid lines in the figure) that enters into the microlens 49 in the left oblique direction in the figure is shielded by the light shielding film 47, it is not concentrated on the right region of the photoelectric conversion element 39.

Moreover, the object light 50L that enters into the microlens 49 on the second phase difference pixel 36b is concentrated on the right region of the photoelectric conversion element 39 by the microlens 49. By contrast, since the object light 50R that enters into the microlens 49 is shielded by the light shielding film 47, it is not concentrated on the left region of the photoelectric conversion element 39.

Figure 7:
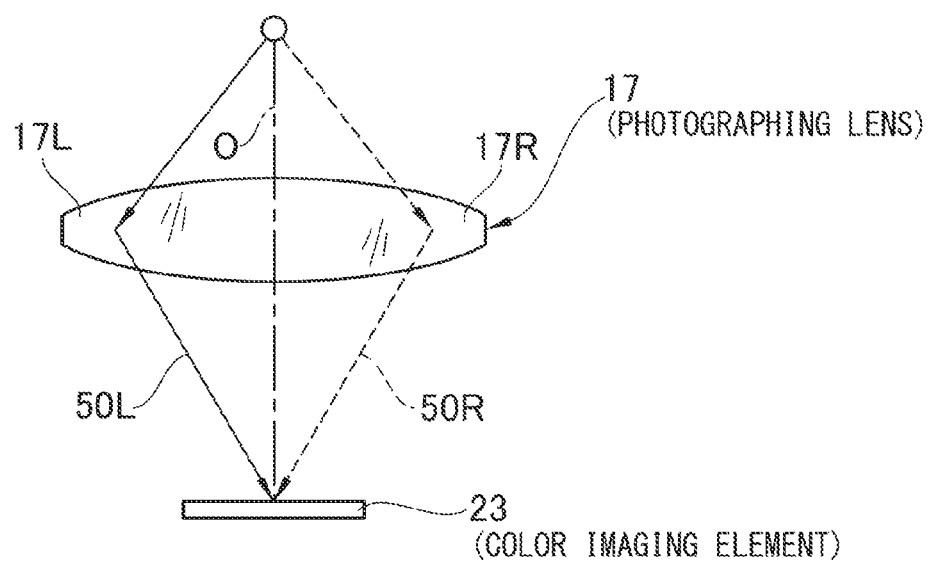
FIG. 7 is an explanatory diagram to describe object light that enters into a color imaging element.

As illustrated in FIG. 7, the object light 50L and the object light 50R pass through a left region 17L and right region 17R of the photographing lens 17 (zoom lens 15 and focus lens 16) respectively. Here, both lenses 15 and 16 are integrally illustrated to prevent the drawing from being complicated.

Returning to FIG. 6, when the object light that enters into the color imaging element 23 is pupil-divided by the light shielding film 47, the first phase difference pixel 36a has high sensibility with respect to the object light 50R, and, by contrast, the second phase difference pixel 36b has high sensibility with respect to the object light 50L. Here, the light shielding film 47 functions as a pupil division unit that performs pupil division in the present embodiment, but, for example, the position of the microlens 49 may be deviated.

Moreover, the object light 50R that enters into the microlens 49 on the RGB pixels 35 to 37 is concentrated on the left region of the photoelectric conversion element 39 and the object light 50L is concentrated on the right region of the photoelectric conversion element 39 though illustration thereof is omitted. Therefore, the RGB pixels 35 to 37 have high sensibility with respect to both the object light 50L and the object light 50R.

<Configuration of Image Processing Circuit>

Figure 8:
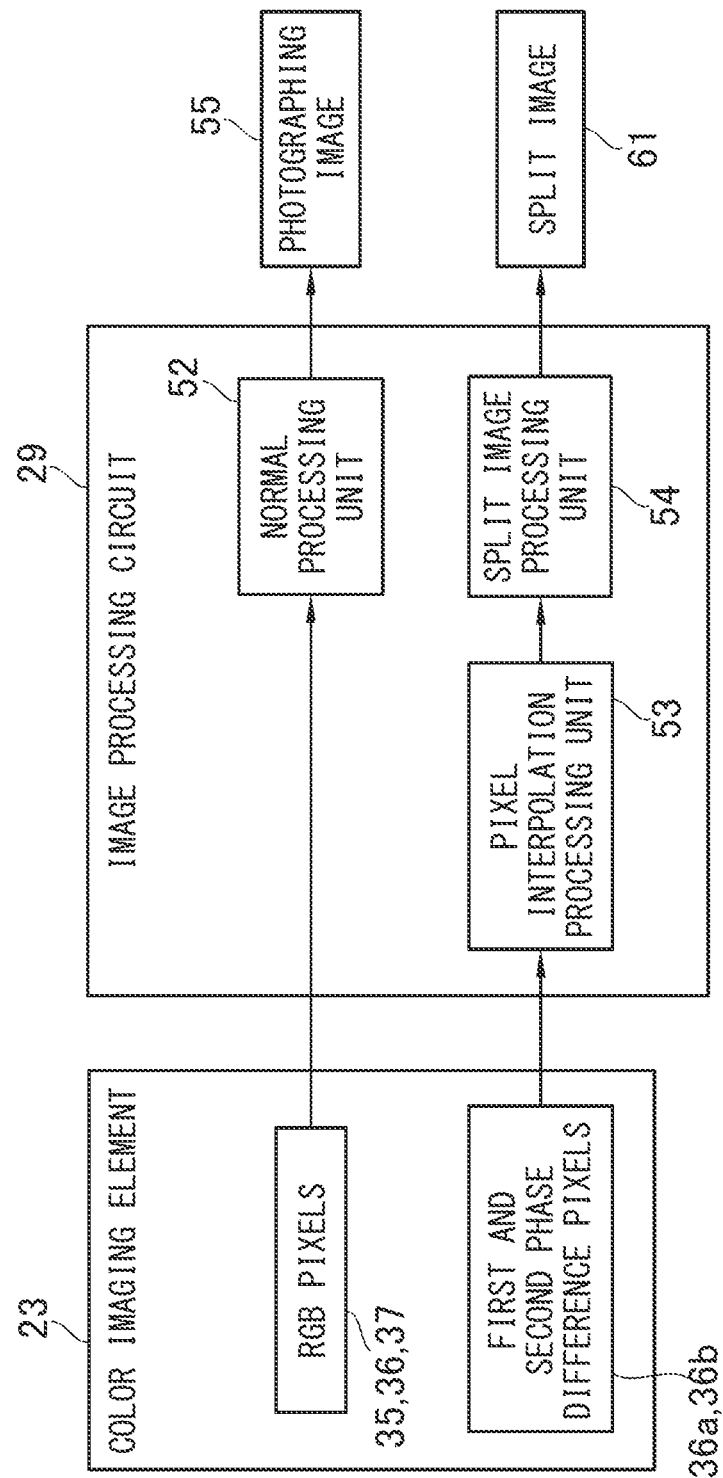
FIG. 8 is a functional block diagram of an image processing circuit.

As illustrated in FIG. 8, the image processing circuit 29 has a normal processing unit (third image generation device) 52, a pixel interpolation processing unit (first interpolation device and second interpolation device) 53 and a split image processing unit (focusing confirmation image generation device) 54. The normal processing unit 52 generates full-color photographing image data 55 on the basis of output signals from the RGB pixels 35 to 37 at the photographing mode. The pixel interpolation processing unit 53 and the split image processing unit 54 operate at the MF mode.

Figure 10A:
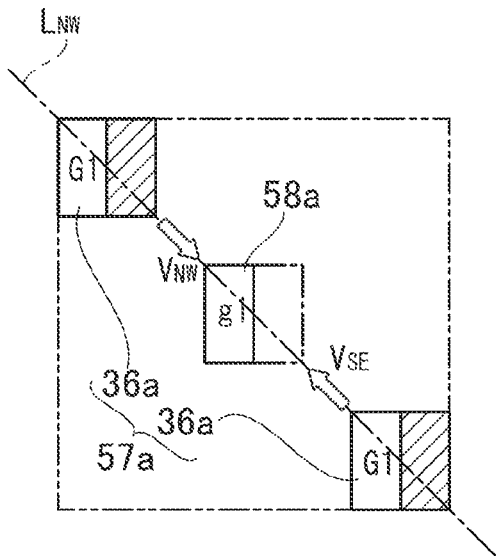
FIGS. 10A and 10B are explanatory diagrams to describe the calculation of the pixel value of the first interpolation pixel in FIG. 9.
Figure 10B:
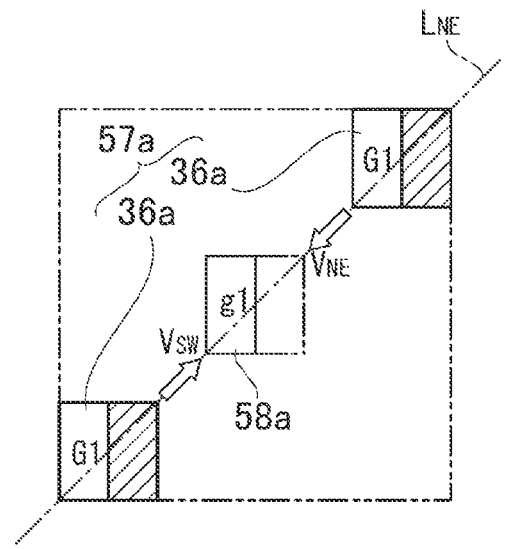

As illustrated in FIG. 9 and FIGS. 10A and 10B, when the first phase difference pixels 36a of the first and second array patterns 42 and 43 disposed in the same pixel lines in pixel lines $L_{NE}$ and $L_{NW}$ are assumed to be a first pixel pair 57a, the pixel interpolation processing unit 53 calculates the pixel value of the first interpolation pixel 58a (displayed with "g1" in the figure) in the intermediate position of the first pixel pair 57a by interpolation processing. Specifically, as shown by arrows $V_{NW}$ and $V_{SE}$ and arrows $V_{NE}$ and $V_{SW}$ in the figure, the pixel interpolation processing unit 53 performs interpolation processing in the oblique (NE, NW) direction and calculates the pixel value of the first interpolation pixel 58a on the basis of both pixel values of the first pixel pair 57a. Here, for example, the average value of both pixel values of the first pixel pair 57a is assumed to be the pixel value of the first interpolation pixel 58a.

Figure 11A:
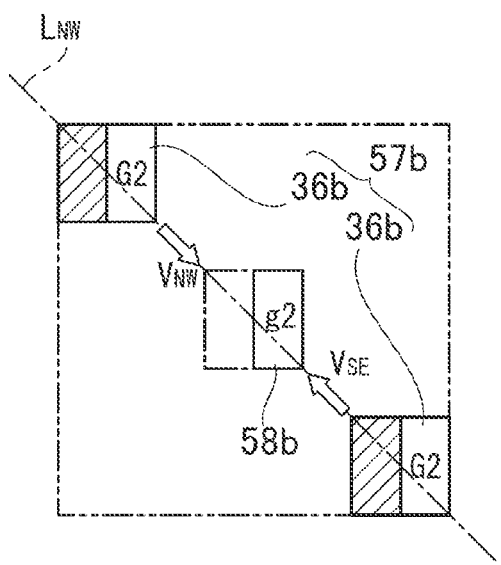
FIGS. 11A and 11B are explanatory diagrams to describe the calculation of the pixel value of the second interpolation pixel in FIG. 9.
Figure 11B:
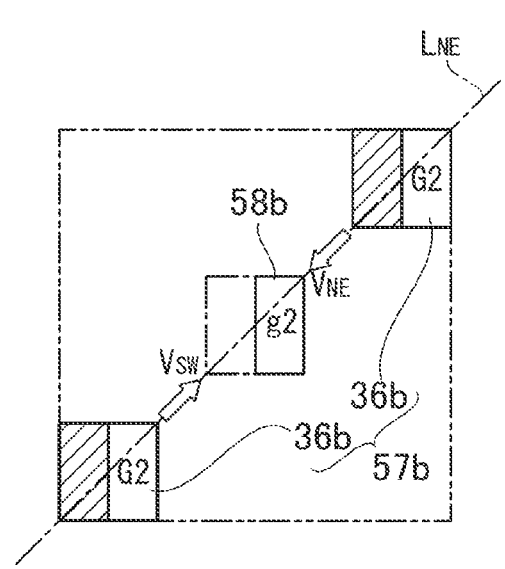

As illustrated in FIG. 9 and FIGS. 11A and 11B, when the second phase difference pixels 36b of the first and second array patterns 42 and 43 disposed in the same pixel lines in pixel lines $L_{NE}$ and $L_{NW}$ are assumed to be a second pixel pair 57b, the pixel interpolation processing unit 53 calculates the pixel value of the second interpolation pixel 58b (displayed with "g2" in the figure) in the intermediate position of the second pixel pair 57b by interpolation processing. Specifically, as shown by arrows $V_{NW}$ and $V_{SE}$ or arrows $V_{NE}$ and $V_{SW}$ in the figure, the pixel interpolation processing unit 53 performs interpolation processing in the oblique (NE, NW) direction and calculates the pixel value of the second interpolation pixel 58b on the basis of both pixel values of the second pixel pair 57b. Here, for example, the average value of both pixel values of the second pixel pair 57b is assumed to be the pixel value of the second interpolation pixel 58a.

By interpolation processing by such the pixel interpolation processing unit 53, each of the pixel values of the first and second interpolation pixels 58a and 58b is calculated at three-pixel intervals along the identical horizontal pixel line. The pixel interpolation processing unit 53 outputs each of the pixel values of the first and second interpolation pixels 58a and 58b to the split image processing unit 54.

The split image processing unit 54 generates monochrome split image data (focusing confirmation image) 61 located in the central region of the object (central region of the photographing image) on the basis of the luminance components of the pixel values of the first and second interpolation pixels 58a and 58b.

As illustrated in FIG. 12, based on the luminance component of the pixel value of the first interpolation pixel 58a, the split image processing unit 54 generates monochrome first image data 61R when the upper half region of the central region of the object is seen from the R viewpoint side in the figure. Moreover, based on the luminance component of the pixel value of the second interpolation pixel 58b, the split image processing unit 54 generates monochrome second image data 61L when the lower half region of the central region of the object is seen from the L viewpoint side in the figure. By this means, the monochrome split image data 61 including the first image data 61R and the second image data 61L is acquired. Here, the split image data 61 is combined with the photographing image data 55 so as to be able to easily understand the image of the split image data 61 in the figure, but this combination is performed in the display control unit 33.

The photographing image data 55 and the split image data 61 are temporarily stored in the VRAM region of the memory 13. The display control unit (display control device) 33 reads out the photographing image data 55 and the split image data 61 from the memory 13, and, after combining the split image data 61 with the photographing image data 55, and outputs the result to the display unit 8. By this means, a live view image that displays a monochrome split image based on the split image data 61 is acquired in the full-color photographing image based on the photographing image data 55.

The first image data 61R and the second image data 61L shifts to the right and left in the figure according to the focusing state of the focus lens 16. The shift amount between the first and second image data 61R and 61L at this time corresponds to the shift amount in the focus of the focus lens 16. Moreover, regarding the first and second image data 61R and 61L, the shift amount becomes 0 (including "almost 0") when the focus lens 16 is focused.

Figure 13:
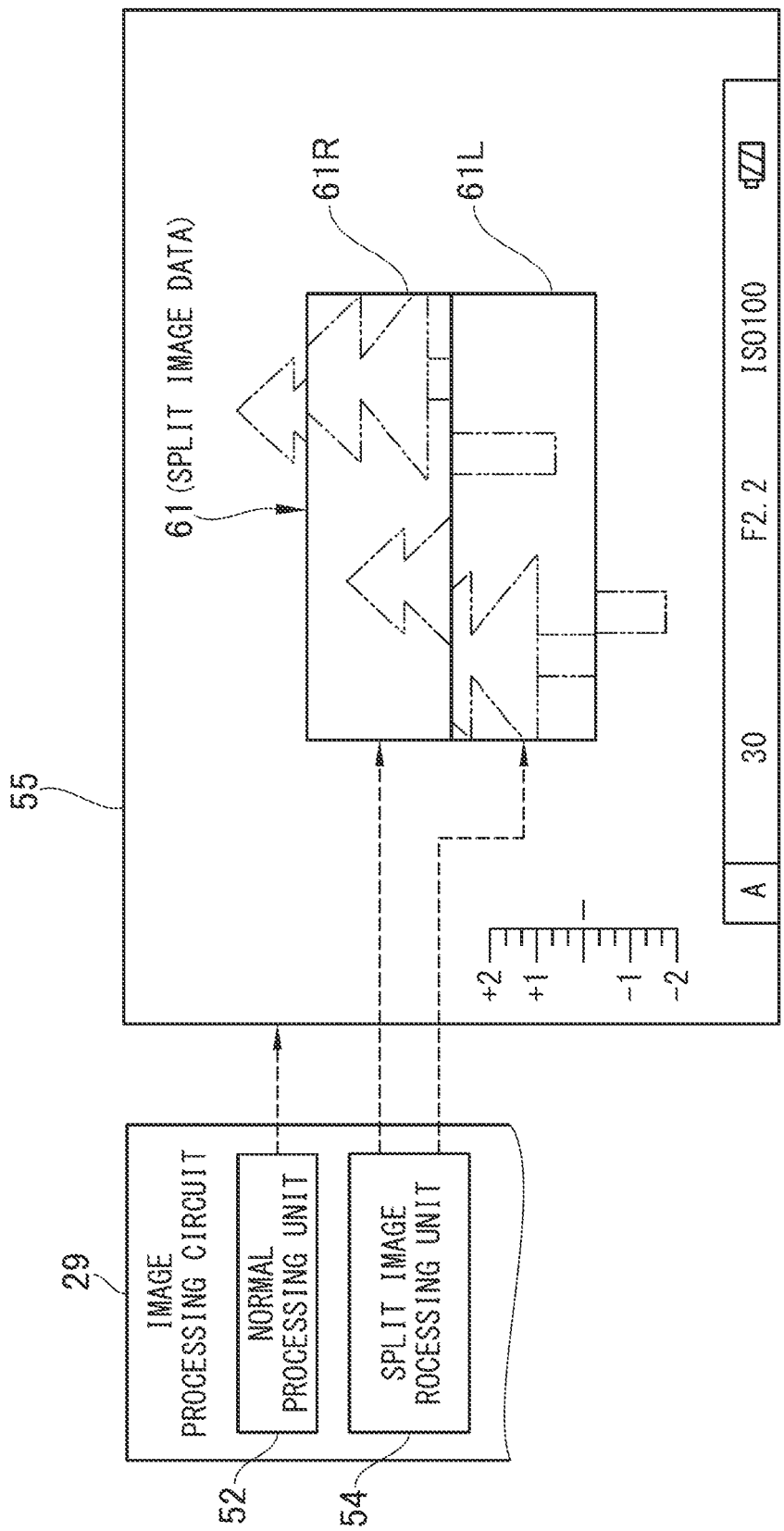
FIG. 13 is an explanatory diagram to describe split image data in a case where a focus lens is not set to a focusing position.

As illustrated in FIG. 13, when the focus of the focus lens 16 is shifted more, the shift amount between the first image data 61R and the second image data 61L becomes larger. By this means, the user can perform focus adjustment while confirming the live view image. Here, an object that is not focused is displayed with a two-dot chain line in the figure.

<Other Components>

Here, an AF detection circuit for automatic focus is installed in the digital camera 2 though illustration thereof is omitted. The AF detection circuit calculates a focus adjustment amount (which is also referred to as "defocus amount") by analyzing an image formed with an output signal of the first phase difference pixel 36a and an image formed with an output signal of the second phase difference pixel 36b and detecting the shift direction of both images and the shift amount between both images. Based on this focus adjustment amount, the CPU 11 performs focus adjustment by driving the focus lens 16 by the lens driver 25 and the focus mechanism 20. Since AF processing of such a phase difference system is known, specific explanation thereof is omitted here.

<Operation of Digital Camera of First Embodiment>

Figure 14:
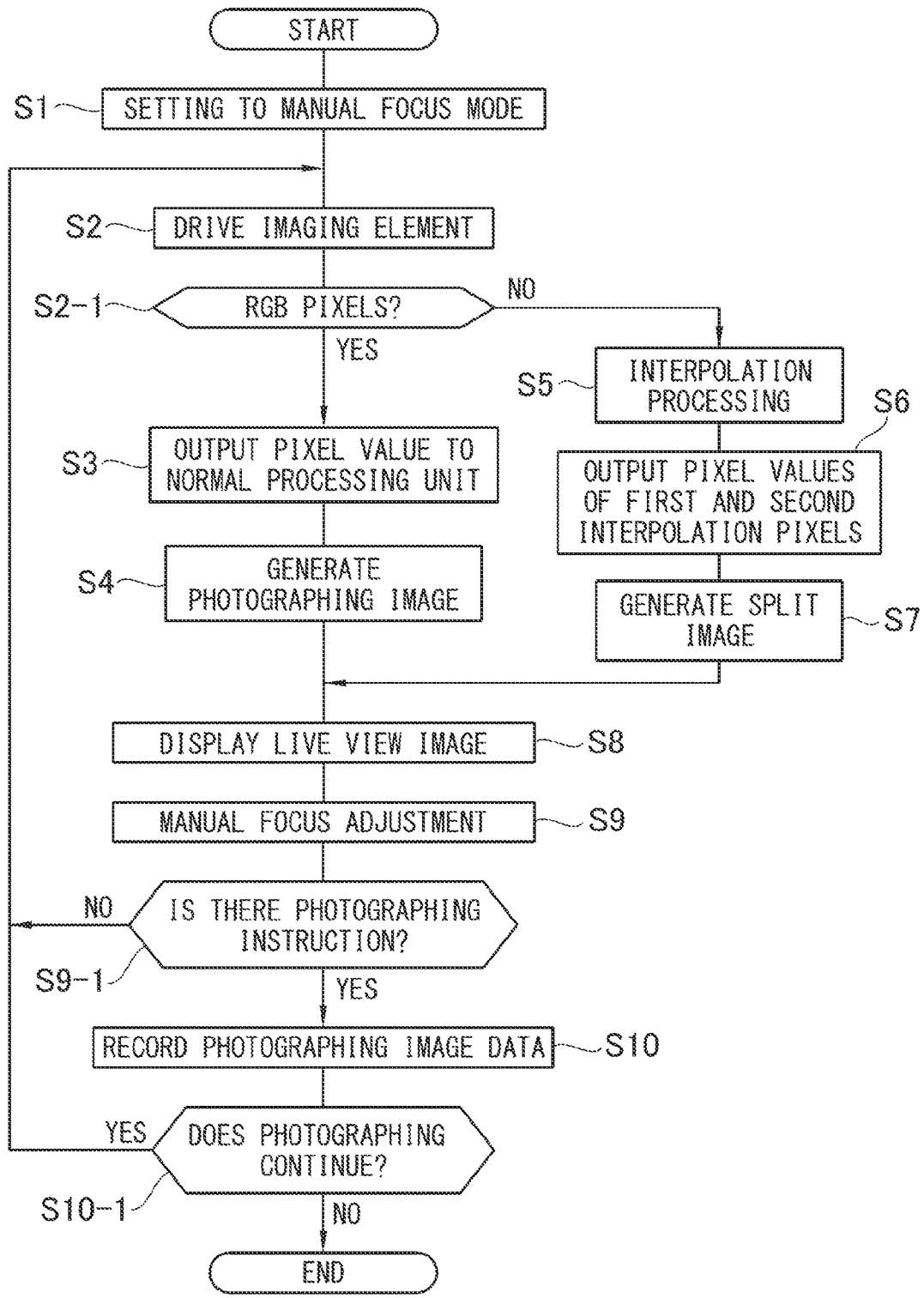
FIG. 14 is a flowchart illustrating the flow of photographic processing of a digital camera according to the first embodiment.

Next, the operation of the digital camera 2 of the above-mentioned configuration is described using FIG. 14. When the digital camera 2 is set to the MF mode of the photographing mode in the operation unit 9 (step S1), the CPU 11 controls the operation of the mechanical shutter 18 through the lens driver 25 and drives the color imaging element 23 through the imaging element driver 27 (step S2). Here, since the operation of the digital camera 2 in a case where the AF mode is set is known, specific explanation thereof is omitted here.

The pixel values (output signals) of the RGB pixels 35 to 37 of the color imaging element 23 are output to the normal processing unit 52 of the image processing circuit 29 (YES in step S2-1, and step S3). The normal processing unit 52 generates the full-color photographing image data 55 on the basis of the pixel values of the RGB pixels 35 to 37 and stores them in the VRAM region of the memory 13 (step S4).

Meanwhile, the pixel values (output signals) of the first and second phase difference pixels 36a and 36b are input in the pixel interpolation processing unit 53 (NO in step S2-1). As illustrated in FIG. 9 and FIG. 10, the pixel interpolation processing unit 53 calculates the pixel value of the first interpolation pixel 58a by performing interpolation processing in the oblique direction on the basis of the pixel value of each first pixel pair 57a in the pair of array patterns 44 (step S5). Moreover, as illustrated in FIG. 9 and FIG. 11, the pixel interpolation processing unit 53 calculates the pixel value of the second interpolation pixel 58b by performing interpolation processing in the oblique direction on the basis of the pixel value of each second pixel pair 57b in the pair of array patterns 44 (step S5).

In the following, similarly, the pixel interpolation processing unit 53 performs similar processing with respect to all pairs of array patterns 44 in the imaging surface and calculates the pixel values of the first and second interpolation pixels 58a and 58b. Further, the pixel interpolation processing unit 53 outputs the pixel values of respective interpolation pixels 58a and 58b to the split image processing unit 54 (step S6).

The split image processing unit 54 generates the first image data 61R on the basis of the luminance components of the pixel values of individual first interpolation pixels 58a and generates the second image data 61L on the basis of the luminance components of the pixel values of individual second interpolation pixels 58b. By this means, the monochrome split image data 61 including the first image data 61R and the second image data 61L is generated (step S7). The split image data 61 is stored in the VRAM region of the memory 13.

After reading out the photographing image data 55 and the split image data 61 from the memory 13 and combining them, the display control unit 33 outputs the result to the display unit 8. By this means, a live view image including a monochrome split image in the full-color photographing image as illustrated in FIG. 12 is displayed on the display unit 8 (step S8).

An image based on the first image data 61R of the split image data 61 and an image based on the second image data 61L, that is, the upper and lower images of the split image shift to the right and left in the figure according to the focusing state of the focus lens 16 as illustrated in FIG. 13. Therefore, the user rotates and operates the focus ring 3a and moves the focus lens 16 by along the optical axis direction. As the focus lens 16 becomes closer to the focusing position in which the object is focused, the shift amount of the upper and lower images of the split image gradually decreases. By this means, the user can perform focus adjustment while confirming the live view image.

When the focus lens 16 is set to the focusing position, the shift amount of the upper and lower images of the split image becomes 0. By this means, the focus lens 16 is focused on the object and the focus adjustment is completed (step S9). Afterward, the above-mentioned processing is repeatedly performed until the shutter button 6 is pressed and operated (NO in step S9-1).

When the shutter button 6 is pressed (YES in step S9-1), the photographing image data 55 for one frame is generated in the normal processing unit 52 and temporarily stored in the VRAM region of the memory 13. After being compressed in the compression extension processing circuit 31, this photographing image data 55 is recorded in the memory card 10 through the media I/F 32 (step S10). Afterward, the above-mentioned processing is repeatedly performed until the MF mode ends (YES in step S10-1).

<Operation Effect of Digital Camera of First Embodiment>

Figure 15:
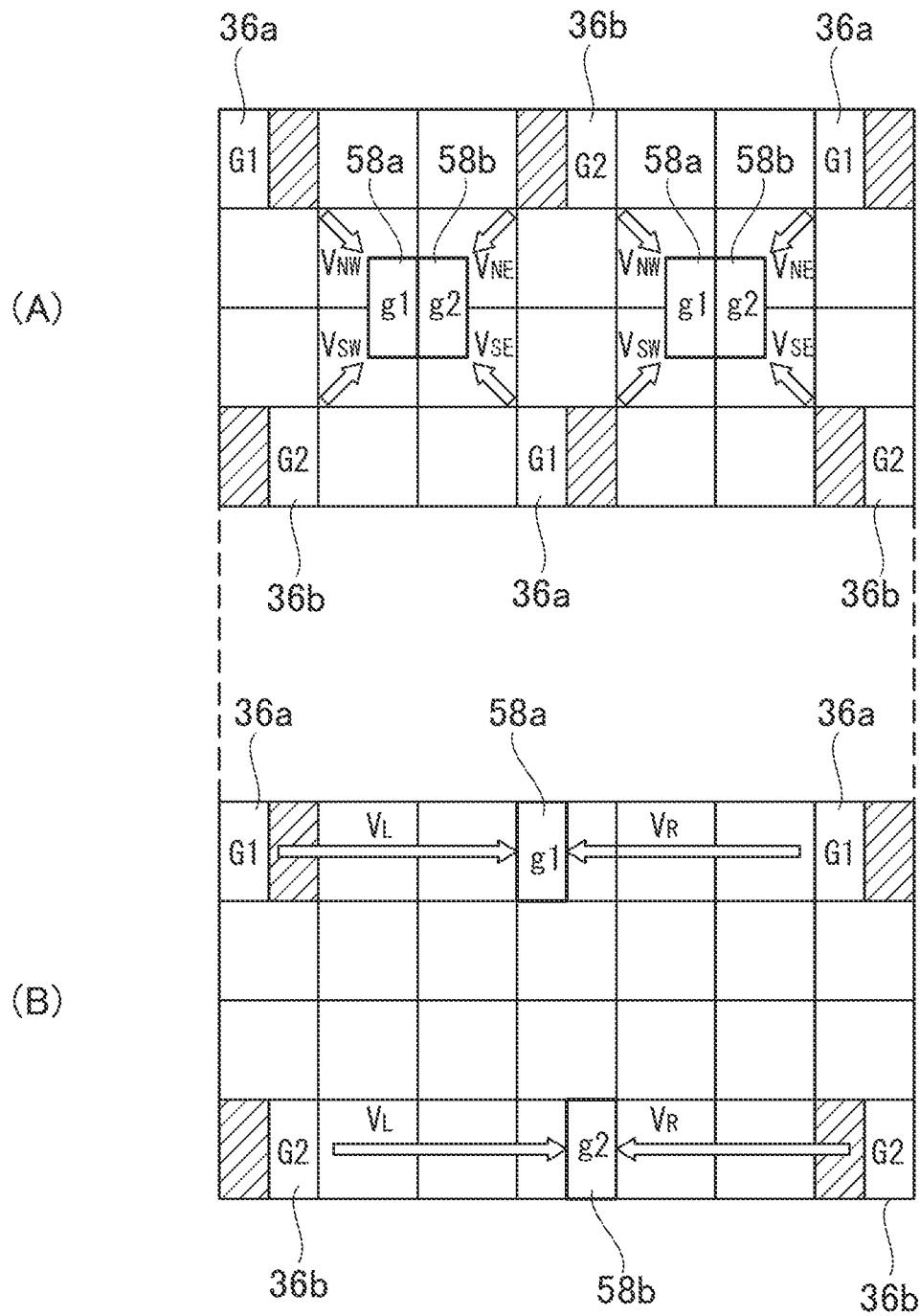
FIG. 15 is an explanatory diagram to describe the effect of the present invention.

As illustrated in part (A) of FIG. 15, in the present invention, the pixel values of the first and second interpolation pixels 58a and 58b are calculated by disposing the pair of array patterns 44 in the imaging surface of the color imaging element 23 and performing interpolation processing in the oblique direction on the basis of the pixel values of the first and second pixel pairs 57a and 57b. By this means, the pixel values of respective interpolation pixels 58a and 58b are calculated on the basis of the pixel values of respective phase difference pixels 36a and 36b that always exist in positions separated by 1.5 pixels.

Meanwhile, in part (B) of FIG. 15 illustrating a comparative example, in a case where interpolation processing in the horizontal direction (vertical direction is also similar) in the related art is performed, a state where the interpolation is not necessary and a state where the interpolation is performed using respective phase difference pixels 36a and 36b in positions separated by three pixels are switched as mentioned above (see FIG. 29 and FIG. 30). Therefore, since the interpolation processing is performed on the basis of the pixel values of respective phase difference pixels 36a and 36b in the positions separated by three pixels at the time of the latter case, there is a risk that the focusing accuracy of a split image decreases due to an increase in jaggies when a high-frequency object is imaged.

By contrast with this, in the present invention, by performing interpolation processing based on the pixel values of respective phase difference pixels 36a and 36b that always exist in a positions (positions separated by 1.5 pixels in the present embodiment) nearer than the comparative example, it is possible to reduce the occurrence of jaggies as compared with the latter state of the comparative example. Therefore, in the present invention, since a state where jaggies increase is not caused unlike the comparative example, it is possible to reduce the occurrence of jaggies as compared with the comparative example when a high-frequency object is imaged in the horizontal direction and the vertical direction. Moreover, since the interpolation processing is performed in the oblique direction, it is possible to reduce the blur of imaged signals when the high-frequency object is imaged in the vertical direction or the horizontal direction. By this means, since the boundary or gap of the upper and lower images of a split image is clearly displayed as compared with the comparative example in the present invention, it is possible to improve the focusing accuracy at the time of MF operation as compared with the comparative example.

[Digital Camera of Second Embodiment]

Figure 16:
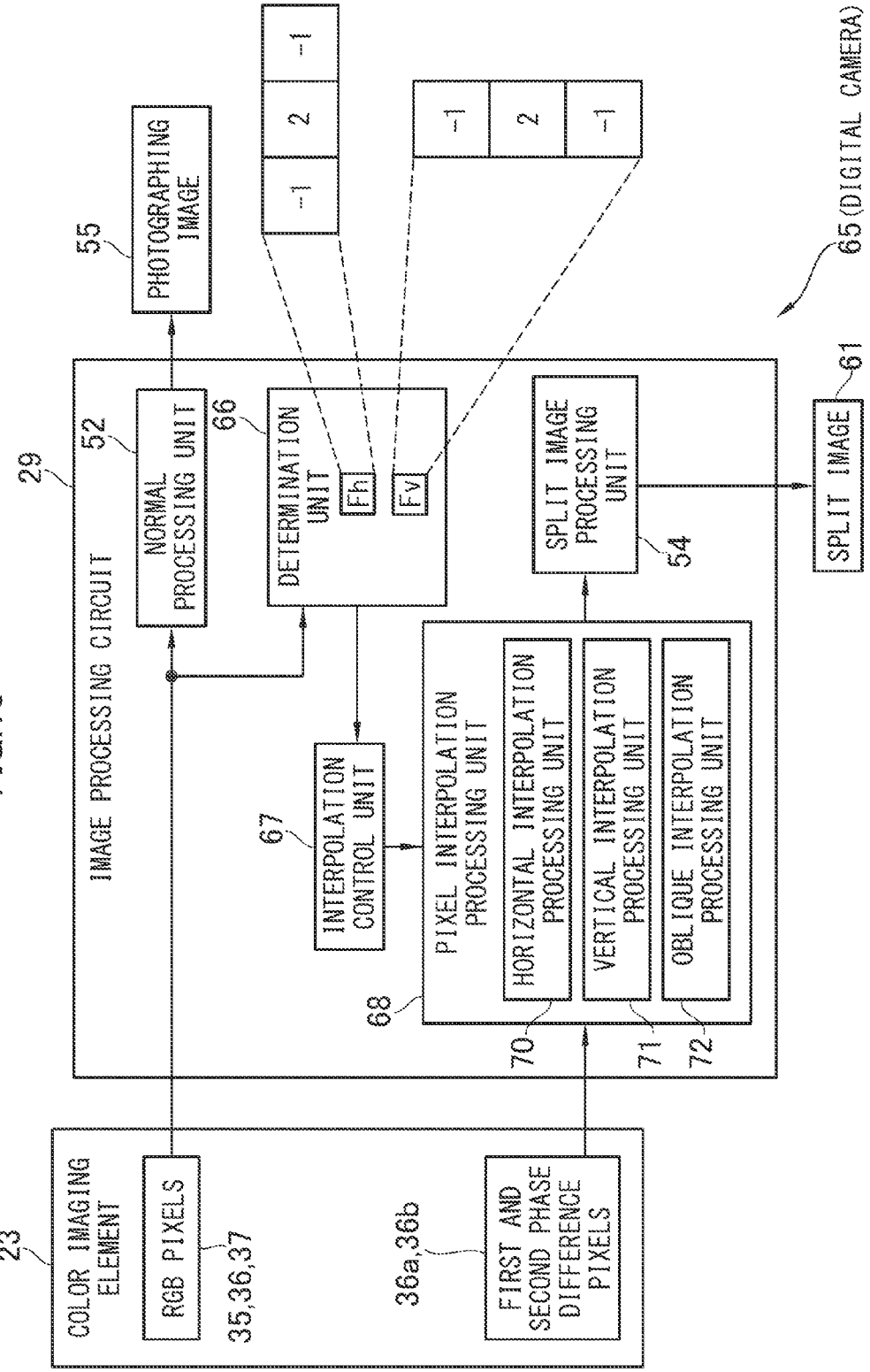
FIG. 16 is a block diagram illustrating an electrical configuration of a digital camera according to the second embodiment.

Next, a digital camera 65 of the second embodiment of the present invention is described using FIG. 16. Interpolation processing in the oblique direction is always performed on the basis of the pixel values of the first and second pixel pairs 57a and 57b in the digital camera 2 of the above-mentioned first embodiment, but optimal interpolation processing is selected and executed among multiple kinds of interpolation processing in the digital camera 65.

Since the digital camera 65 has basically the same components as the above-mentioned first embodiment except for that a determination unit 66, an interpolation control unit 67 and an interpolation processing unit 68 are installed in the image processing circuit 29, as for the ones of the same function and configuration as the above-mentioned first embodiment, the same reference numerals are assigned and explanation thereof is omitted.

The determination unit 66 determines a direction with high correlation of RGB pixels 35 and the intensity of the correlation. This determination unit 66 convolutes filter Fh and filter Fv with the RGB pixels 35 to 37, for example, the pixel values (output signals) of the G pixels 36 forming the above-mentioned square array 41 (see FIG. 4), and substitutes convolution result Rh of filter Fh and convolution result Rv of filter Fv into equation (1) and equation (2) listed below.

$$100 \times Rh < Rv \tag{1}$$

$$Rh > 100 \times Rv \tag{2}$$

In a case where above equation (1) is satisfied, it is determined that RGB pixels 35 have a high correlation in the vertical direction, that is, an imaged signal acquired by imaging is a vertical high-frequency signal acquired by imaging a vertical high-frequency object. Moreover, in a case where above equation (2) is satisfied, it is determined that RGB pixels 35 have a high correlation in the horizontal direction, that is, an imaged signal acquired by imaging is a horizontal high-frequency signal acquired by imaging a horizontal high-frequency object. Further, in a case where neither above equation (1) nor equation (2) is satisfied, it is determined that an imaged signal acquired by imaging is neither a vertical high-frequency signal nor a horizontal high-frequency signal. The determination result of the determination unit 66 (whether above equation (1) and equation (2) are satisfied) is output to the interpolation control unit 67.

The interpolation control unit 67 corresponds to interpolation control means of the present invention, and, in addition, functions as a determination device of the present invention together with the above-mentioned determination unit 66. Based on the determination result of the determination unit 66, the interpolation control unit 67 selects interpolation processing corresponding to the determination result from multiple kinds of interpolation processing, and causes the interpolation processing unit 68 to perform this interpolation processing. The interpolation control unit 67 causes the interpolation processing unit 68 to perform horizontal interpolation processing in a case where above equation (1) is satisfied, causes the interpolation processing unit 68 to perform vertical interpolation processing in a case where above equation (2) is satisfied, and causes the interpolation processing unit 68 to perform oblique interpolation processing in a case where neither above equation (1) nor equation (2) is satisfied.

The interpolation processing unit 68 includes a horizontal interpolation processing unit (third interpolation device) 70, a vertical interpolation processing unit (fourth interpolation device) 71 and an oblique interpolation processing unit (first and second interpolation device) 72.

Figure 29:
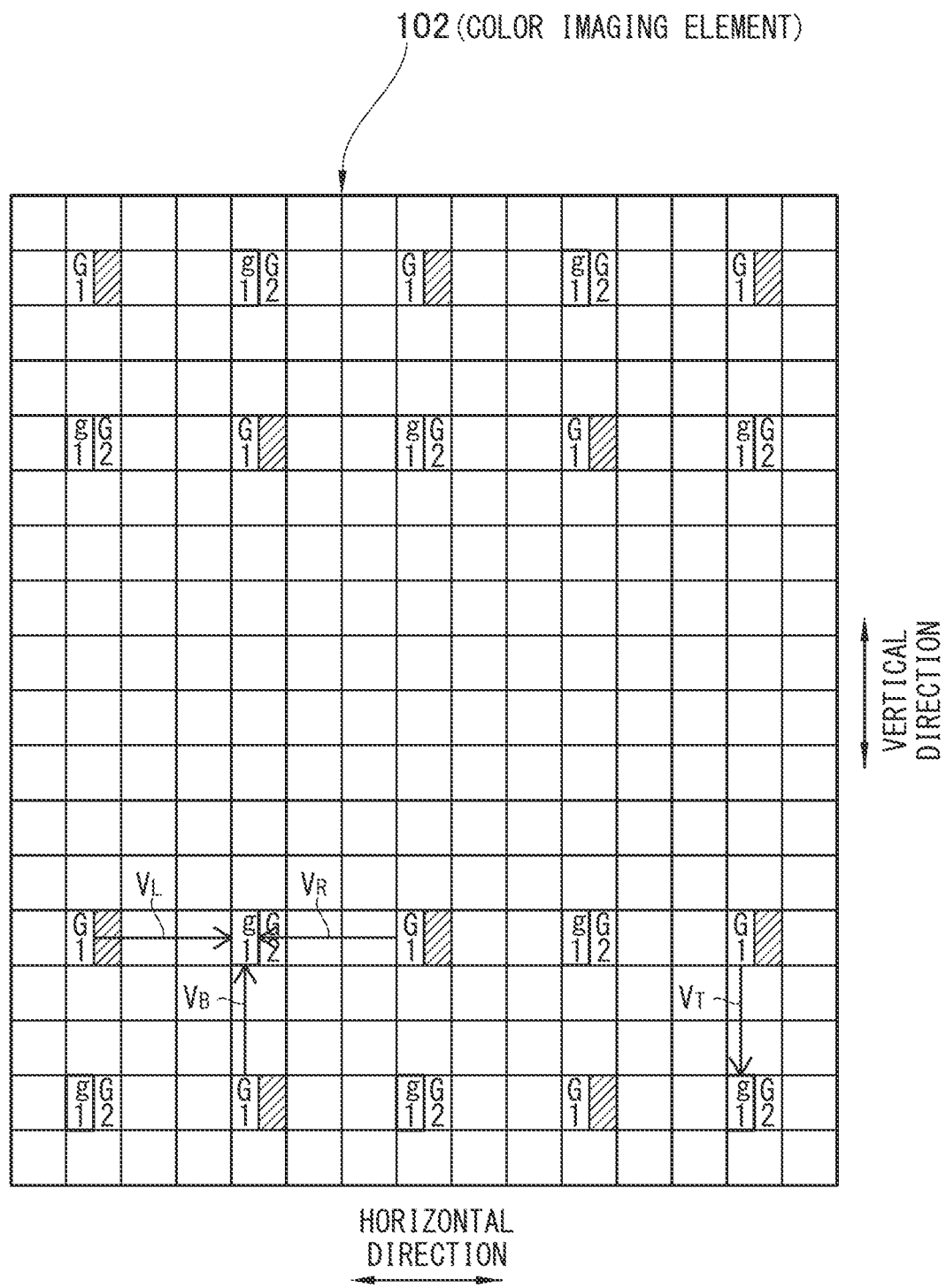
FIG. 29 is an explanatory diagram to describe the calculation of the pixel value of the first interpolation pixel in a case where the first phase difference pixel is disposed in a W-shaped manner.
Figure 30:
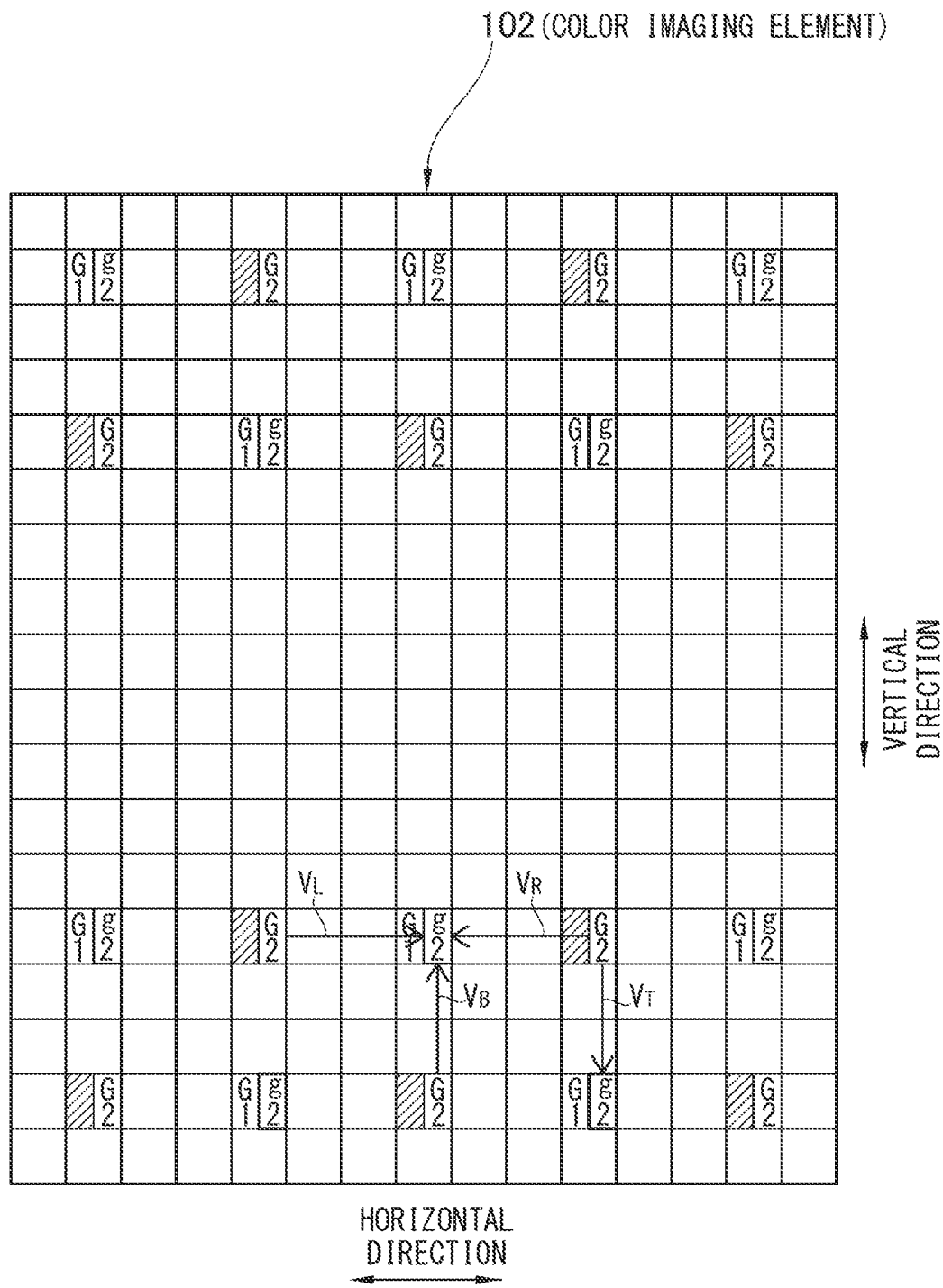
FIG. 30 is an explanatory diagram to describe the calculation of the pixel value of the first interpolation pixel in a case where the second phase difference pixel is disposed in an M-shaped manner.

As illustrated in above-mentioned FIG. 29, FIG. 30 and part (B) of FIG. 15, the horizontal interpolation processing unit 70 performs horizontal interpolation processing on the basis of the pixel values of respective first and second phase difference pixels 36a and 36b in the first and second array patterns 42 and 43. Specifically, as shown by arrows $V_L$ and $V_R$ in the figure, the pixel value of the first interpolation pixel 58a located between first phase difference pixels 36a respectively located in the first and second array patterns 42 and 43 is calculated using the pixel values of the first phase difference pixels 36a located on the left side and right side of this first interpolation pixel 58a in the figure. Moreover, the pixel value of the second interpolation pixel 58b located between respective second phase difference pixels 36b is calculated in the same way. In this case, the first interpolation pixel 58a corresponds to the third interpolation pixel of the present invention and the second interpolation pixel 58b corresponds to the fourth interpolation pixel of the present invention.

As illustrated in above-mentioned FIG. 29 and FIG. 30, the vertical interpolation processing unit 71 performs vertical interpolation processing on the basis of the pixel values of respective first and second phase difference pixels 36a and 36b in the first and second array patterns 42 and 43. Specifically, as shown by arrows $V_T$ and $V_B$ in the figure, the pixel value of the first interpolation pixel 58a located between first phase difference pixels 36a of one of the first and second array patterns 42 and 43 is calculated using the pixel value of the first phase difference pixel 36a located in the same vertical pixel line as the first interpolation pixel 58a in the other of the array patterns 42 and 43. Moreover, the pixel value of the second interpolation pixel 58b located between respective second phase difference pixels 36b is calculated in the same way. In this case, the first interpolation pixel 58a corresponds to the fifth interpolation pixel of the present invention and the second interpolation pixel 58b corresponds to the sixth interpolation pixel of the present invention.

The oblique interpolation processing unit 72 is equivalent to the pixel interpolation processing unit 53 of the first embodiment and performs oblique interpolation processing illustrated in above-mentioned FIG. 9.

<Operation of Digital Camera of Second Embodiment>

Figure 17:
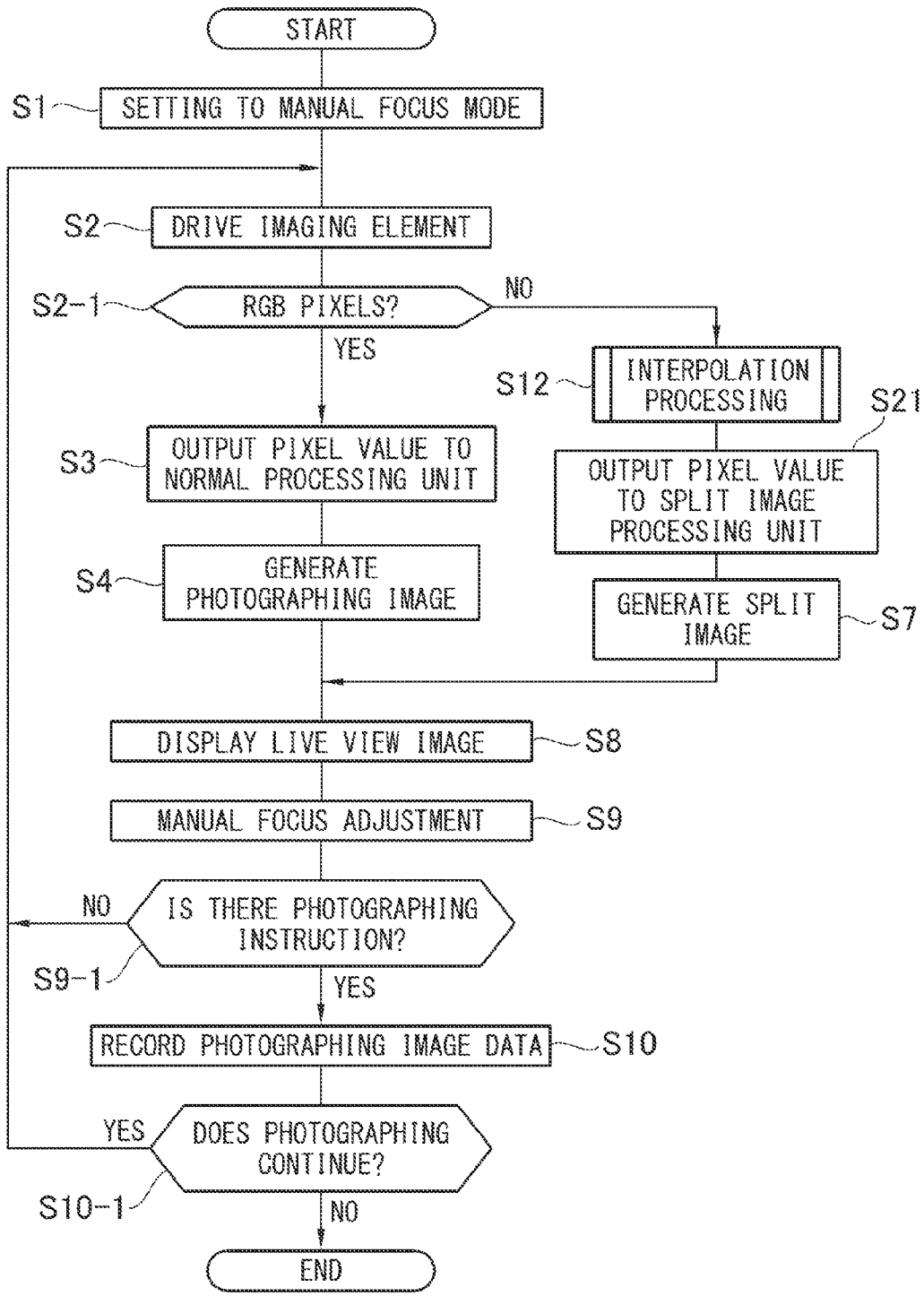
FIG. 17 is a flowchart illustrating the flow of photographic processing of a digital camera according to the second embodiment.
Figure 18:
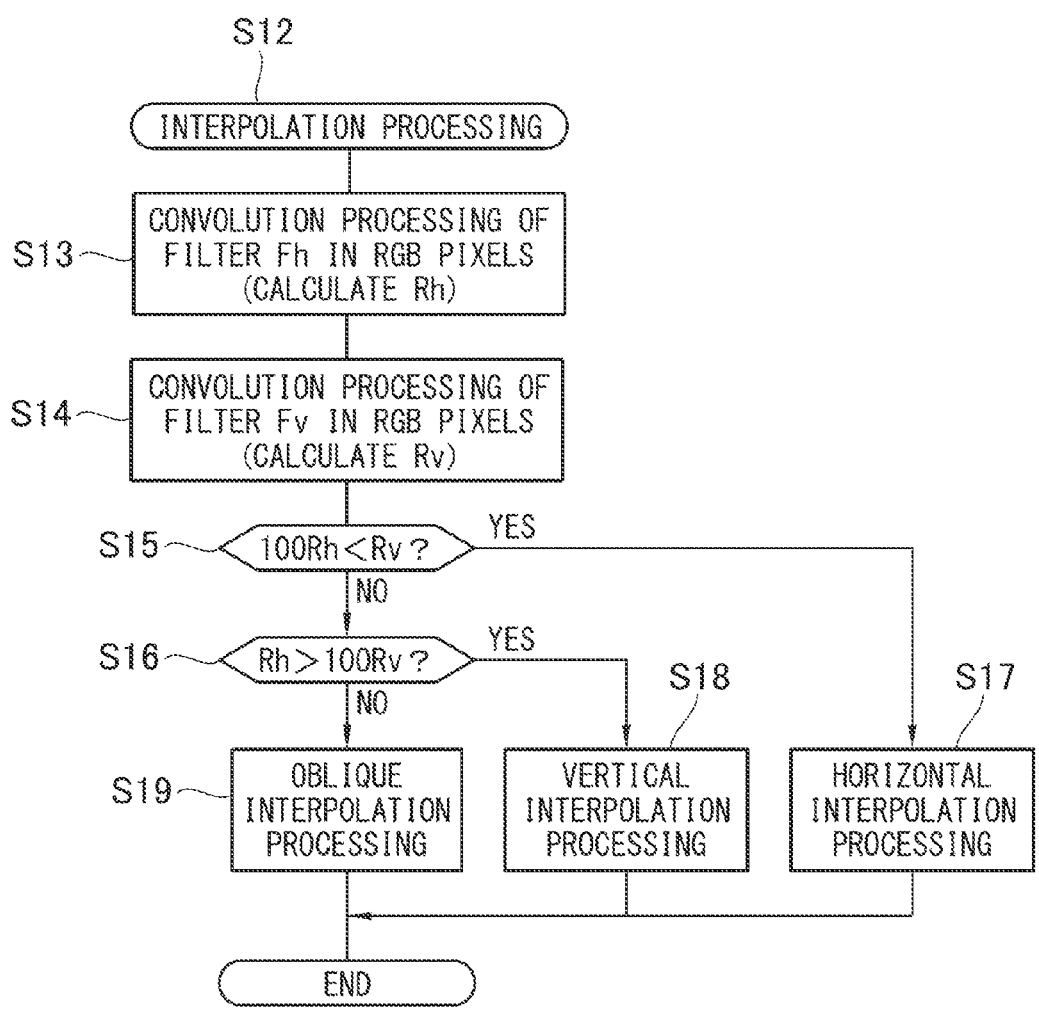
FIG. 18 is a flowchart to describe the flow of interpolation processing according to the second embodiment.

Next, the operation of the digital camera 65 of the above-mentioned configuration is described using FIG. 17 and FIG. 18. Here, since processing in step S1 to step S4 is the same as the above-mentioned first embodiment, specific explanation thereof is omitted here.

In FIG. 18, when step S3 is executed, the determination unit 66 convolutes filter Fh and filter Fv with the pixel values of the G pixels 36 forming the square array 41, and calculates convolution result Rh of filter Fh and convolution result Rv of filter Fv (steps S13 and S14).

Next, the determination unit 66 substitutes convolution results Rh and Rv into above equation (1) and equation (2), and determines whether above equation (1) and equation (2) are satisfied (steps S15 and S16). By this means, it is possible to determine a direction with high correction of the RGB pixels 35 and the intensity of the correlation. The determination result of the determination unit 66 is output to the interpolation control unit 67.

In a case where equation (1) is satisfied (YES in step S15), the interpolation control unit 67 determines that the imaged signal is a vertical high-frequency signal, and operates the horizontal interpolation processing unit 70 to perform the above-mentioned horizontal interpolation processing (step S17). By this means, the pixel values of the first and second interpolation pixels 58a and 58b are calculated (see FIG. 29 and FIG. 30).

Moreover, in a case where equation (2) is satisfied (NO in step S15 and YES in step S16), the interpolation control unit 67 determines that the imaged signal is a horizontal high-frequency signal, and operates the vertical interpolation processing unit 71 to perform the above-mentioned vertical interpolation processing (step S18). By this means, the pixel values of the first and second interpolation pixels 58a and 58b are calculated (see FIG. 29 and FIG. 30).

Further, in a case where equation (1) and equation (2) are not satisfied (NO in steps S15 and S16), the interpolation control unit 67 determines that the imaged signal is neither the horizontal high-frequency signal nor the vertical high-frequency signal, and operates the oblique interpolation processing unit 72 to perform oblique interpolation processing (step S19). By this means, the pixel values of the first and second interpolation pixels 58a and 58b are calculated (see FIG. 9).

Returning to FIG. 17, in a case where the horizontal interpolation processing or the vertical interpolation processing is performed, the pixel values of the first and second phase difference pixels 36a and 36b and the pixel values of the first and second interpolation pixels 58a and 58b are output to the split image processing unit 54 (step S21). The split image processing unit 54 generates the first image data 61R on the basis of the pixel value of the first phase difference pixel 36a and the pixel value of the first interpolation pixel 58a, and generates the second image data 61L on the basis of the pixel value of the second phase difference pixel 36b and the pixel value of the second interpolation pixel 58b. By this means, the split image data 61 is generated (step S7).

Moreover, in a case where the oblique interpolation processing is performed, similar to the first embodiment, the pixel values of respective interpolation pixels 58a and 58b are output to the split image processing unit 54 and the split image data 61 is generated in this split image processing unit 54 (steps S21 and S7). Since processing subsequent to this is basically the same as the first embodiment, explanation thereof is omitted.

Thus, in the second embodiment, since optimal interpolation processing is selected on the basis of the result of determining a direction with high correlation of the RGB pixels 35 and the intensity of the correlation, even in a case where signal correlation in the horizontal direction or vertical direction is extremely strong, it is possible to suppress the occurrence of blur and jaggies of a split image. As a result, it is possible to improve the focusing accuracy at the time of MF operation. Here, a method of determining the direction with high correlation of the RGB pixels 35 and the intensity of the correlation is not limited to the above-mentioned method, and it is possible to use various known methods.

[Digital Camera of Third Embodiment]

Figure 19:
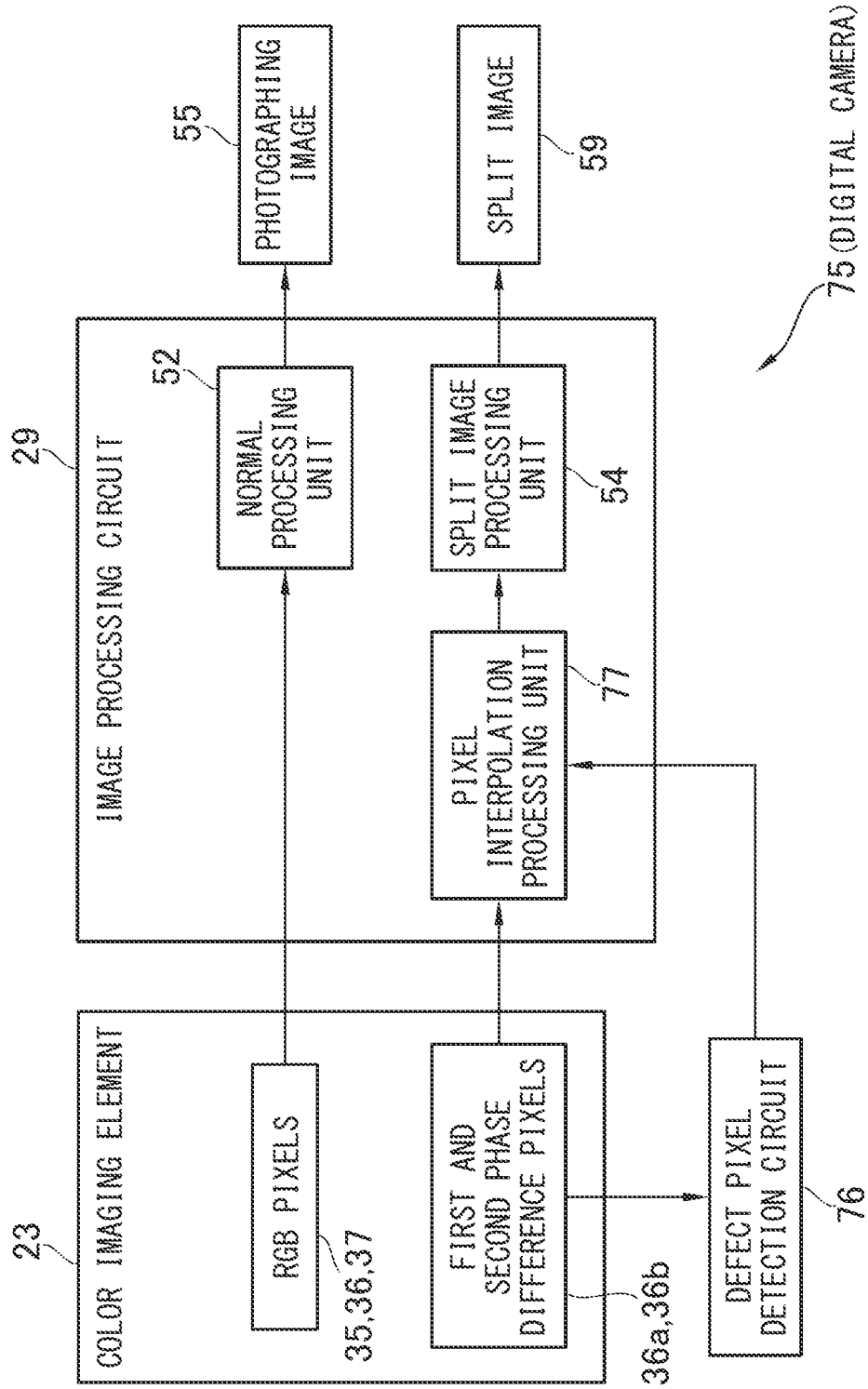
FIG. 19 is a block diagram illustrating an electrical configuration of a digital camera according to the third embodiment.

Next, a digital camera 75 of the third embodiment of the present invention is described using FIG. 19. A case where all of the first and second phase difference pixels 36a and 36b are normal pixels has been described in the above-mentioned first embodiment, but oblique interpolation processing supporting a case where the first and second phase difference pixels 36a and 36b are defect pixels is performed in the digital camera 75.

Since the digital camera 75 has basically the same components as the above-mentioned first embodiment except for that a defect pixel detection circuit (defect pixel detection device) 76 and a pixel interpolation processing unit (first and second interpolation device) 77 are installed, as for the ones of the same function and configuration as the above-mentioned first embodiment, the same reference numerals are assigned and explanation thereof is omitted.

The defect pixel detection circuit 76 detects a defect pixel from each of the first and second phase difference pixels 36a and 36b. Here, before the detection of this defect pixel, for example, imaging by the color imaging element 23 is performed under a shading state where the imaging surface of the color imaging element 23 is shaded by the mechanical shutter 18. That is, the pixel values of respective phase difference pixels 36a and 36b of the color imaging element 23 under the shading state are calculated. The pixel values of respective phase difference pixels 36a and 36b acquired in this way indicate the level of dark outputs of respective phase difference pixels 36a and 36b. Here, a method of calculating the level of the dark output of each of the phase difference pixels 36a and 36b is not limited to the above-mentioned method, and it is possible to use various known methods.

The defect pixel detection circuit 76 determines whether the pixel values of respective phase difference pixels 36a and 36b acquired under the shading state are within a range decided beforehand, and, in a case where they are values out of this range, determines that they are defect pixels. By this means, it is possible to detect the defect pixel from respective phase difference pixels 36a and 36b. Here, a detection method of the defect pixel is not limited to the above-mentioned method, and it is possible to use various known methods. The defect pixel detection result by the defect pixel detection circuit 76 is output to the pixel interpolation processing unit 77.

The pixel interpolation processing unit 77 is basically the same as the pixel interpolation processing unit 53 of the first embodiment, and, in a case where both of respective pixels of the first and second pixel pairs 57a and 57b (see FIG. 10 and FIG. 11) are normal pixels, the oblique interpolation processing similar to the first embodiment is performed (see FIG. 9).

Figure 20:
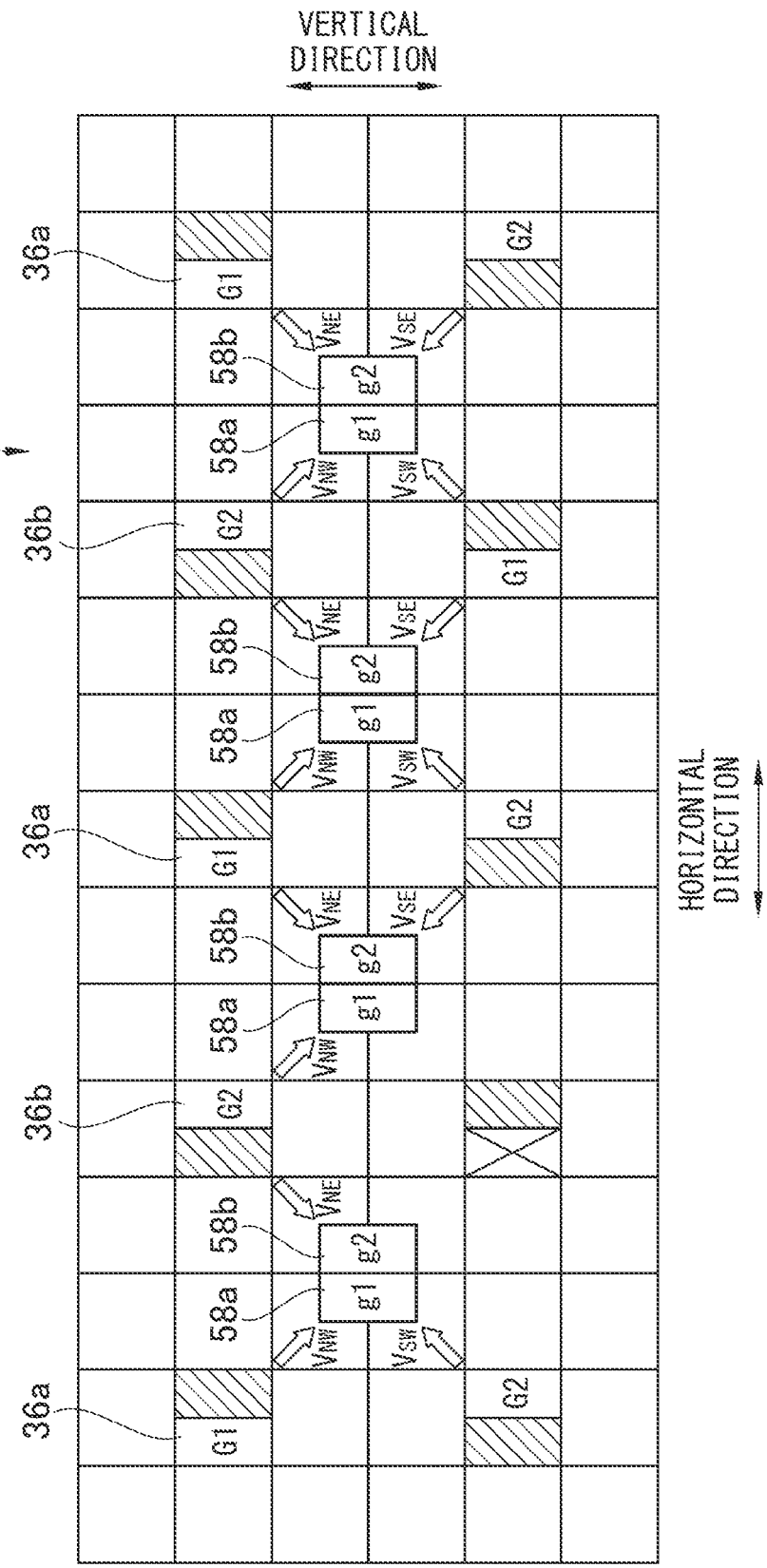
FIG. 20 is an explanatory diagram to describe oblique interpolation processing in a case where one of the first pixel pair or one of the second pixel pair is a defect pixel.

Meanwhile, as illustrated in FIG. 20, based on the detection result of the defect pixel detection circuit 76, in a case where one of the first pixel pair 57a is a defect pixel (displayed with "x" in the figure), the interpolation processing unit 77 decides the pixel value of the other first phase difference pixel 36a of the first pixel pair 57a as the pixel value of the first interpolation pixel 58a. Moreover, in a case where one of the second pixel pair 57b is a defect pixel, the interpolation processing unit 77 decides the pixel value of the other second phase difference pixel 36b of the second pixel pair 57b as the pixel value of the second interpolation pixel 58b.

Figure 21:
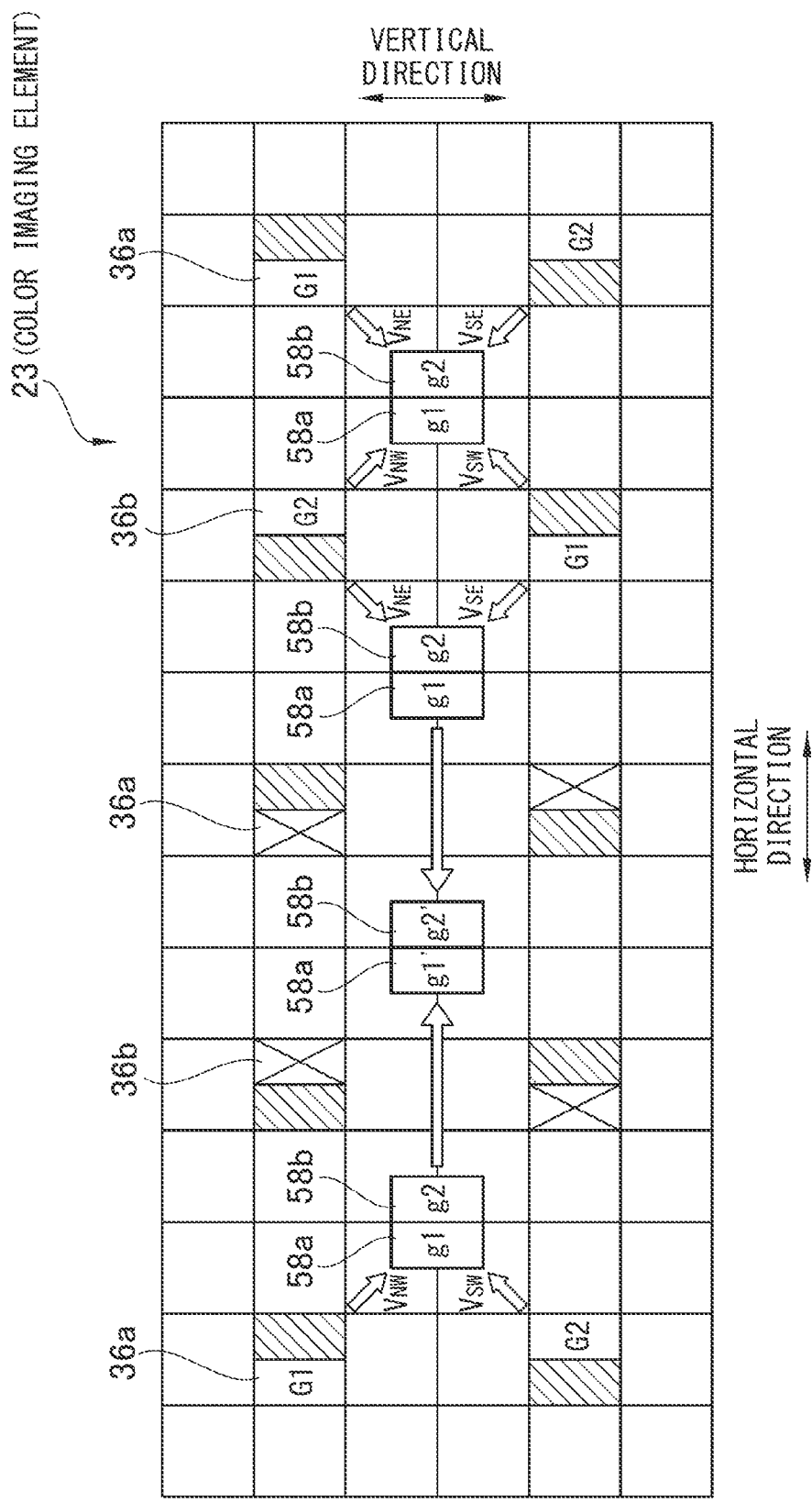
FIG. 21 is an explanatory diagram to describe oblique interpolation processing in a case where both of the first pixel pair or both of the second pixel pair are defect pixels.

Further, as illustrated in FIG. 21, in a case where both of the first pixel pair 57a disposed in the N-th place (N is a natural number equal to or greater than 2: N=2 in the present embodiment) along the horizontal direction (from the left side to the right side in the figure) are defect pixels, the interpolation processing unit 77 calculates the pixel values of the first interpolation pixels 58a respectively corresponding to the (N−1)-th and (N+1)-th first pixel pairs 57a beforehand. Further, the interpolation processing unit 77 decides the average value of both pixel values calculated beforehand, as the pixel value of the N-th first interpolation pixel 58a (displayed with "g1'" in the figure).

Moreover, in a case where both of the second pixel pair 57b disposed in the N-th place are defect pixels, the interpolation processing unit 77 calculates the pixel values of the second interpolation pixels 58b respectively corresponding to the (N−1)-th and (N+1)-th second pixel pairs 57b beforehand. Further, the interpolation processing unit 77 decides the average value of both pixel values calculated beforehand, as the pixel value of the N-th second interpolation pixel 58b (displayed with "g2'" in the figure).

Since processing subsequent to this is basically the same as the first embodiment, explanation thereof is omitted.

Thus, in the digital camera 75 of the third embodiment, in a case where the first and second phase difference pixels 36a and 36b are defect pixels, it is possible to calculate the pixel values of the first and second interpolation pixels 58a and 58b without using the defect pixels. As a result, since it is possible to prevent the occurrence of blur and jaggies of a split image even if respective phase difference pixels 36a and 36b are defect pixels, it is possible to improve the focusing accuracy at the time of MF operation.

[Others]

Figure 22:
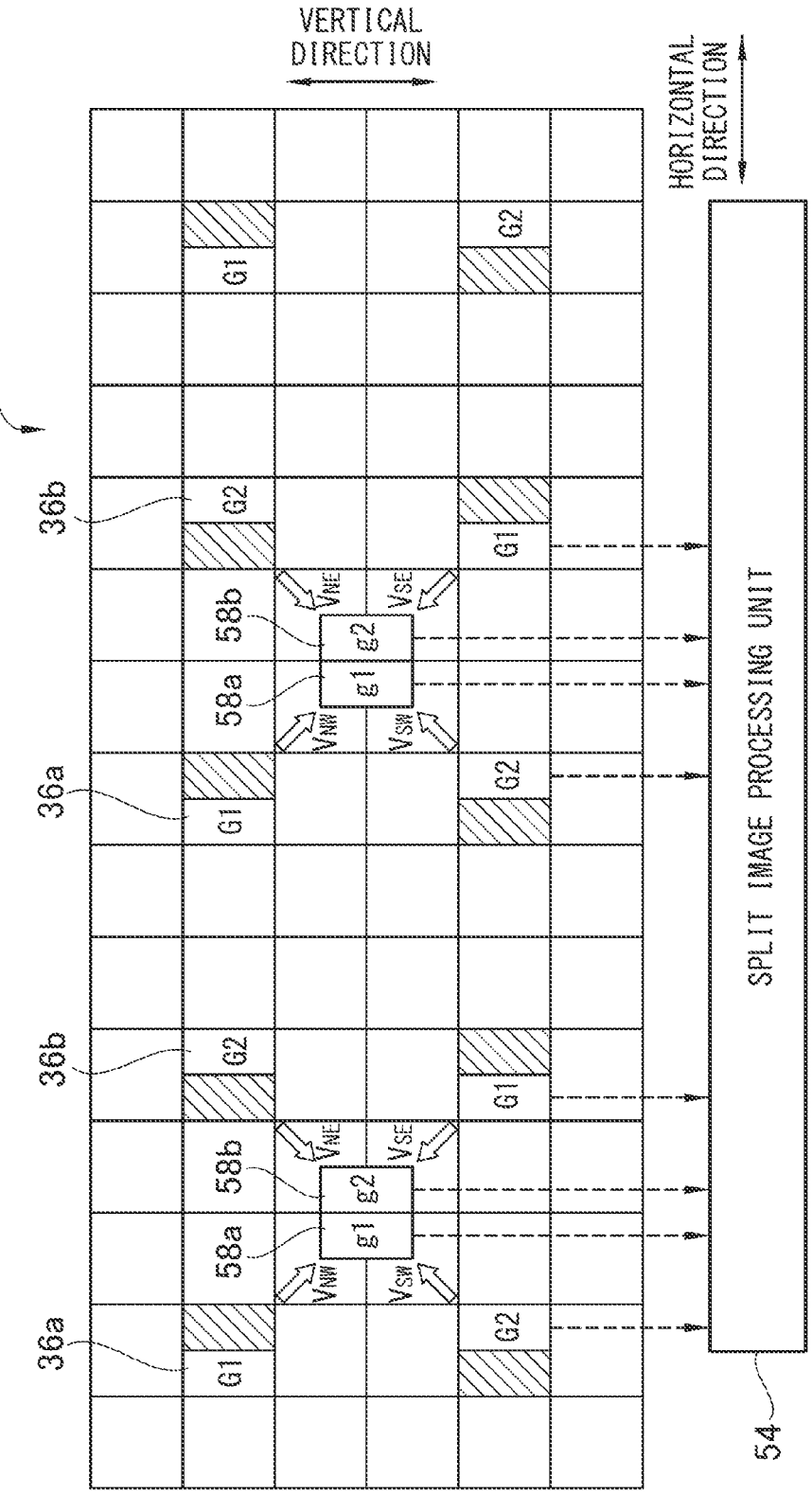
FIG. 22 is an explanatory diagram to describe another embodiment in which split image data is generated by the use of the pixel values of the first and second phase difference pixels and the pixel values of the first and second interpolation pixels.

The split image data 61 is generated on the basis of the pixel values of the first and second interpolation pixels 58a and 58b acquired by oblique interpolation processing in the above-mentioned first embodiment, but, for example, as illustrated in FIG. 22, the split image data 61 may be generated on the basis of the pixel values of respective interpolation pixels 58a and 58b and the pixel values of respective phase difference pixels 36a and 36b. Here, in this case, since respective phase difference pixels 36a and 36b are disposed at six-pixel intervals, it is preferable that the pixel values of respective interpolation pixels 58a and 58b are calculated at six-pixel intervals according to this.

Figure 23:
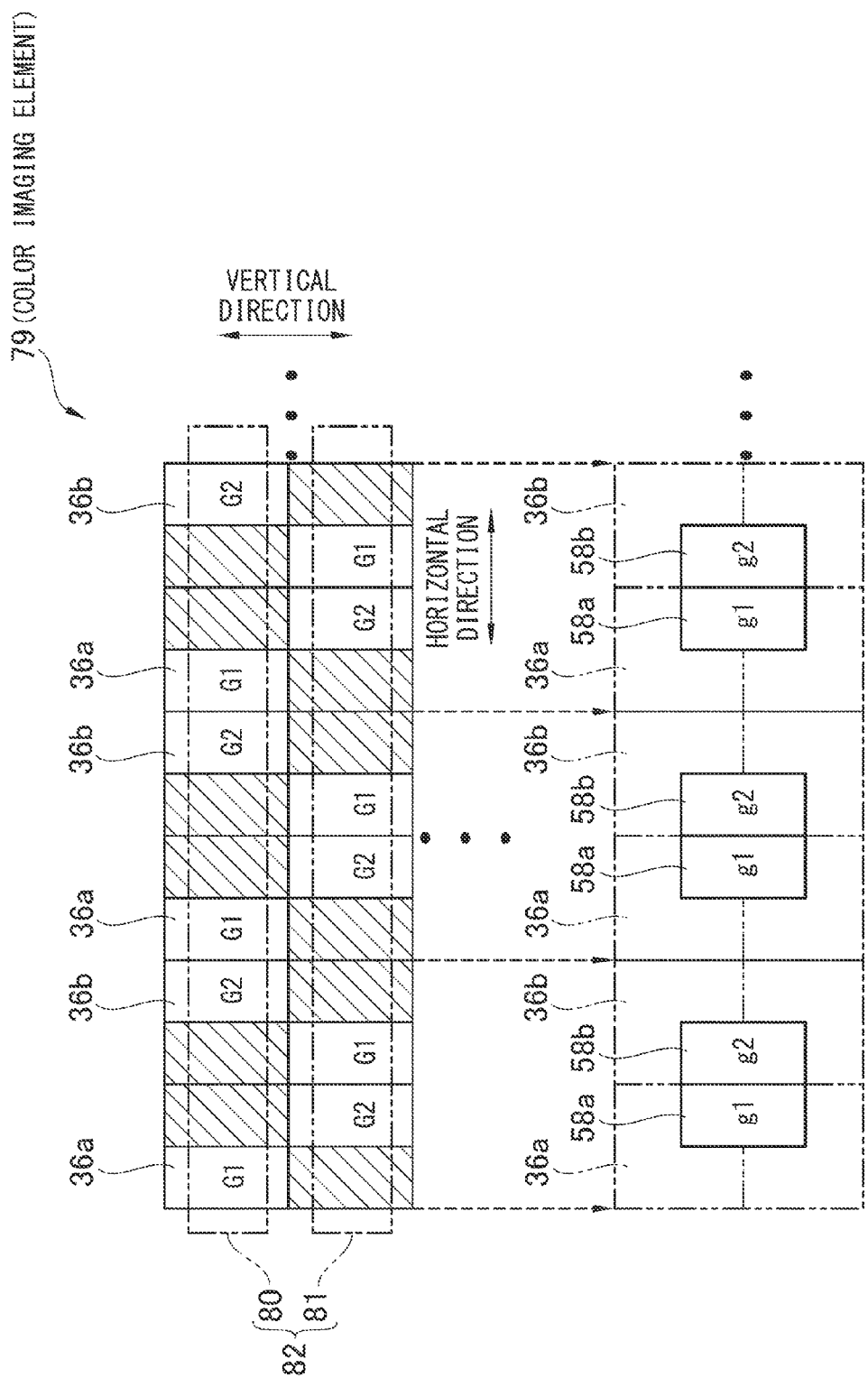
FIG. 23 is an explanatory diagram to describe another embodiment in which all pixels of a color imaging element are formed with the first and second phase difference pixels.

The RGB pixels 35 to 37 and the first and second phase difference pixels 36a and 36b are two-dimensionally arrayed on the imaging surface of the color imaging element 23 in above-mentioned respective embodiments, but, for example, as illustrated in FIG. 23, the present invention is applicable even to a case where only the first and second phase difference pixels 36a and 36b are two-dimensionally arrayed on the imaging surface of a color imaging element 79. In this case, a pair of array patterns 82 having a first array pattern 80 and a second array pattern 81 are installed on the imaging surface of the color imaging element 79, and this pair of array patterns 82 are arrayed in the vertical direction multiple times.

In the first array pattern 80, the first phase difference pixel 36a and the second phase difference pixel 36b are alternately arrayed along the horizontal direction. The second array pattern 81 is acquired by shifting the first array pattern 80 by one-pixel interval in the horizontal direction.

Even in a case where such the color imaging element 79 is used, it is possible to calculate the pixel values of the first and second interpolation pixels 58a and 58b respectively by the oblique interpolation processing similar to the above-mentioned first embodiment. Moreover, since all pixels on the imaging surface are formed with the first and second phase difference pixels 36a and 36b, it is possible to generate stereoscopic parallax image data on the basis of the pixel values of respective phase difference pixels 36a and 36b. Here, in this case, the photographing image data 55 illustrated in above-mentioned FIG. 12 or the like is generated on the basis of the result of adding or averaging any one pixel value or both pixel values of the first and second phase difference pixels 36a and 36b.

In above-mentioned respective embodiments, the first and second phase difference pixels 36a and 36b are alternately disposed at three-pixel intervals in the horizontal direction in the first and second array patterns 42 and 43 and respective array patterns 42 and 43 are shifted by three-pixel intervals in the vertical direction and disposed, but these intervals may be changed appropriately. Moreover, respective phase difference pixels 36a and 36b may be alternately disposed at $\alpha$-pixel ($\alpha$ is a natural number equal to or greater than 1) intervals in respective array patterns 42 and 43, and respective array patterns 42 and 43 may be shifted by $\beta$-pixel ($\beta \neq \alpha$) intervals in the vertical direction and disposed. The directions of oblique interpolation in this case (third direction and fourth direction) are other directions than the ones of +45°.

The pair of array patterns 44 are disposed at 12-pixel intervals in the vertical direction in above-mentioned respective embodiments, but they may be disposed at $\gamma$-pixel ($\gamma$ is a natural number equal to or greater than 1) intervals. Here, for example, in a case where $\gamma=\beta$ is established, oblique interpolation processing may be performed between the second array pattern 43 of one of two pairs of array patterns 44 arranged in the vertical direction and the first array pattern 42 of the other.

An explanation has been given where, as the split image data 61, the one divided into two in the vertical direction (upper and lower) is exemplified in above-mentioned respective embodiments, the split image data of the present invention includes the one that is displayed as a double image in the case of defocus and clearly displayed in a focusing state when two phase difference images (first image and second image) are convoluted for synthetic display.

For example, the split image data 61 may be divided into two in the horizontal direction or divided into two in the oblique direction (NE, NW). Moreover, the split image data 61 may be divided in a strip-shaped manner in the vertical direction or horizontal direction, and first image data generated on the basis of the pixel value of the first interpolation pixel 58a and second image data generated on the basis of the pixel value of the second interpolation pixel 58b may be alternately displayed. In addition, the split image data 61 may be divided in a lattice manner, and the first image data and the second image data may be arranged in a checkered manner (checker pattern) and displayed.

RGB pixels of three colors have been described as normal pixels in above-mentioned respective embodiments, but, for example, pixels of four colors formed with three primary colors of RGB and another color (for example, emerald (E)) may be possible, and the kind of pixels is not especially limited. Moreover, the present invention is also applicable to pixels of C (cyanogen), M (magenta) and Y (yellow) that are complementary colors of primary colors RGB. Moreover, at least two of above-mentioned respective embodiments may be arbitrarily combined.

An explanation has been given in above-mentioned respective embodiments where a digital camera is exemplified as the imaging device of the present invention, but, for example, the present invention is also applicable to a portable telephone machine, smartphone, PDA (Personal Digital Assistants), tablet computer and portable game machine which have a photograph function. In the following, a detailed explanation is given with reference to the drawings while exemplifying the smartphone.

<Configuration of Smartphone>

Figure 24:
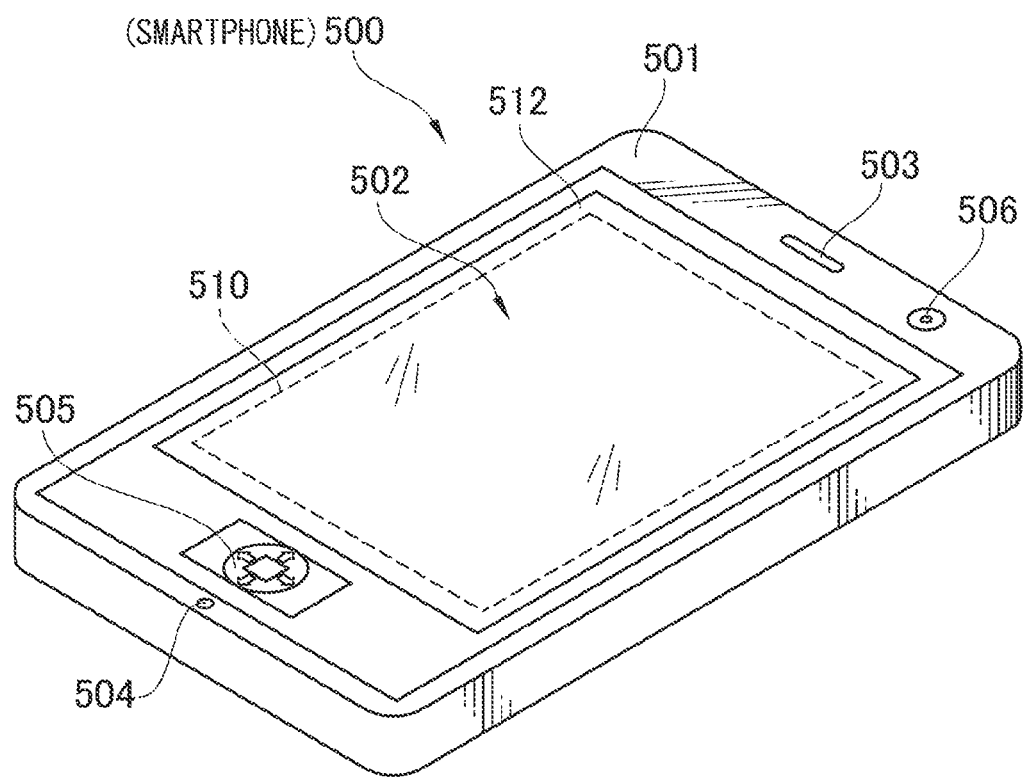
FIG. 24 is a perspective view of a smartphone.

FIG. 24 illustrates the appearance of a smartphone 500. The smartphone 500 has a tabular chassis 501. One surface of the chassis 501 includes a display input unit 502, a speaker 503, a microphone 504, an operation unit 505 and a camera unit 506. Here, the configuration of the chassis 501 is not limited to this, and, for example, it is also possible to adopt a configuration in which the display unit and the input unit are independent or a configuration having a folded structure or sliding mechanism.

The display input unit 502 displays an image (still image and moving image) and character information, and so on, by control of a display processing unit 508 having received an instruction from a CPU 507. Moreover, the display input unit 502 has a so-called touch panel structure to detect user operation with respect to displayed information. This display input unit 502 is configured with a display panel 510 and an operation panel 512.

As for the display panel 510, an LCD (Liquid Crystal Display) and an OELD (Organic Electro-Luminescence Display), and so on, are used as a display device. The operation panel 512 has optical transparency and is placed on the display surface of the display panel 510. This operation panel 512 is a device that detects one or more coordinates operated with user's finger or stylus. When this device is operated by user's finger or stylus, a detection signal generated depending on the operation is output to the CPU of the smartphone 500. The CPU detects the operation position (coordinates) on the display panel 510 on the basis of the received detection signal. In a position detection system adopted in such the operation panel 512, there are a matrix switch system, a resistance film system, a surface elastic wave system, an infrared ray system, an electromagnetic induction system and an electrostatic capacity method, and so on.

Figure 25:
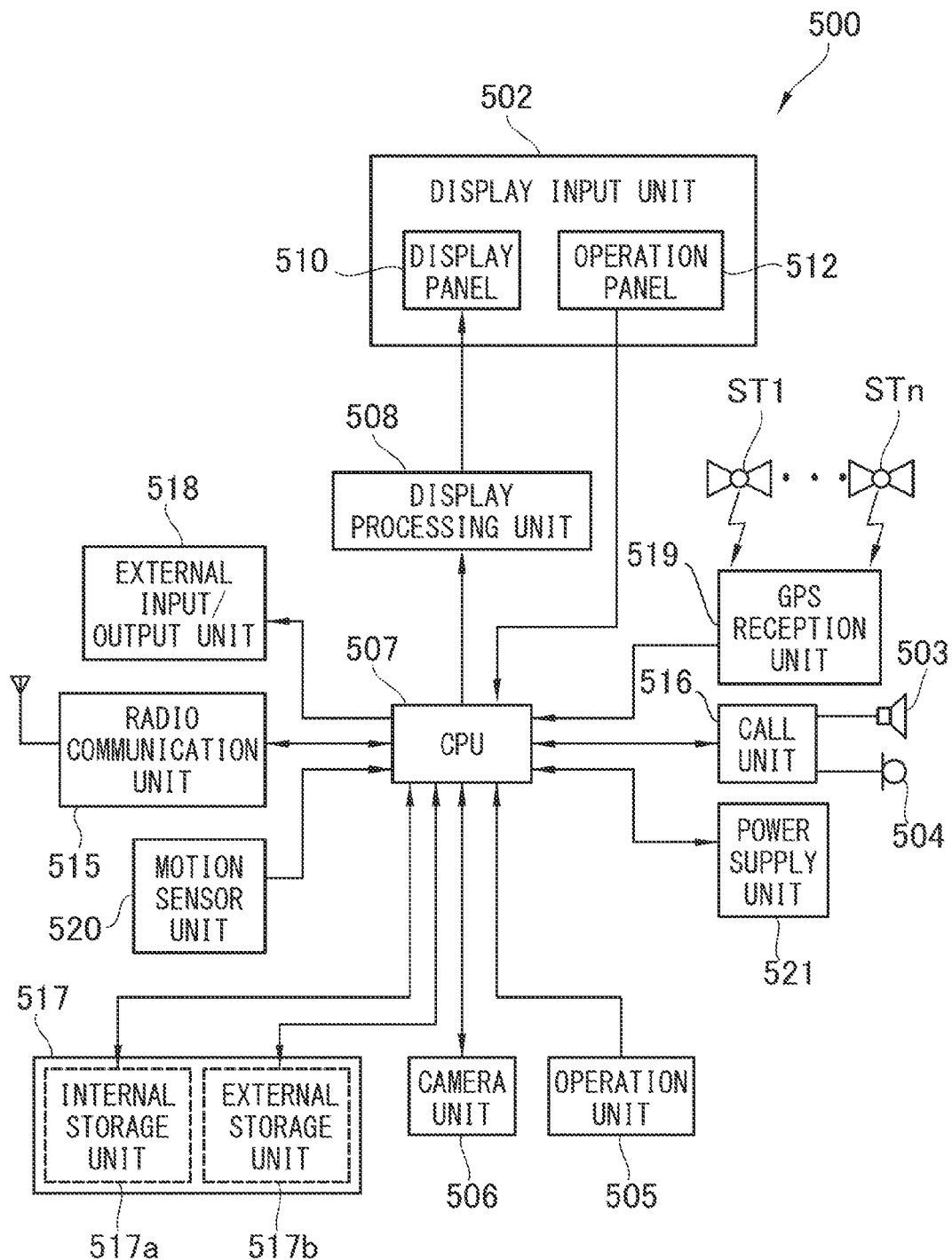
FIG. 25 is a block diagram illustrating an electrical configuration of a smartphone.
Figure 26:
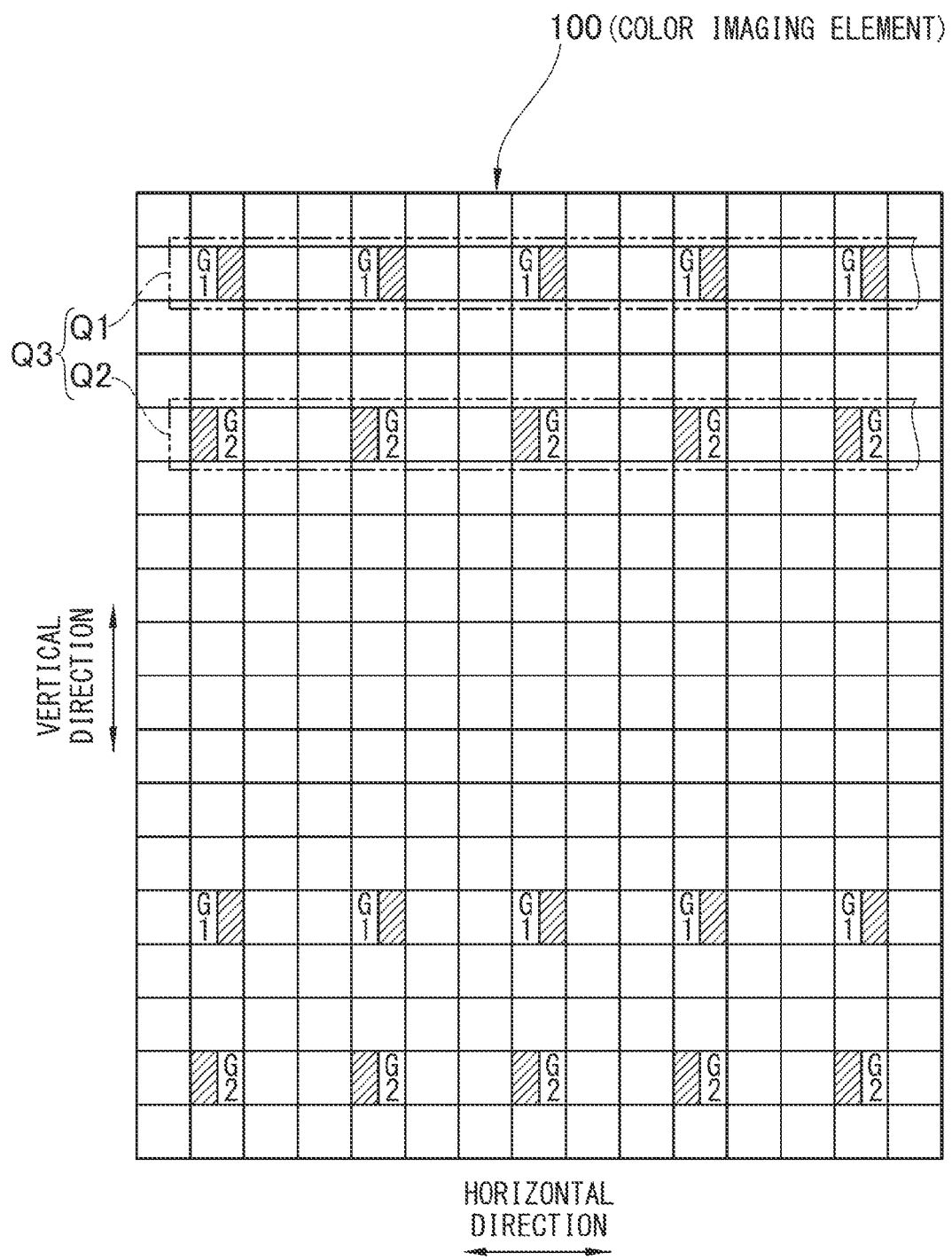
FIG. 26 is a front view of a color imaging element in the related art in which the first and second array patterns are formed with one kind of phase difference pixel respectively.
Figure 27A:
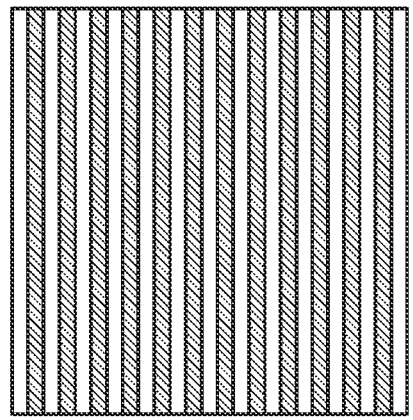
FIGS. 27A and 27B are explanatory diagrams to describe an object of high frequency in the horizontal direction.
Figure 27B:
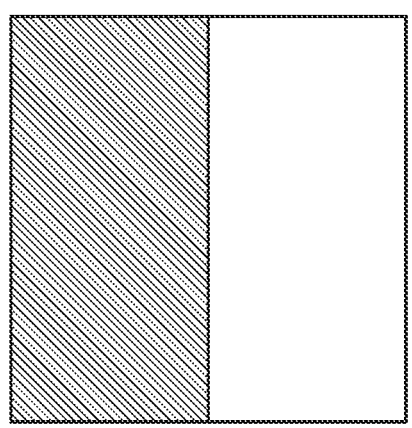
Figure 28A:
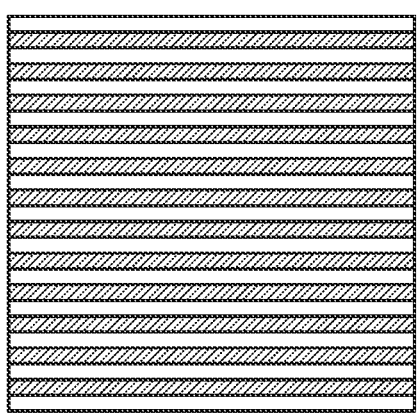
FIGS. 28A and 28B are explanatory diagrams to describe an object of high frequency in the vertical direction.
Figure 28B:
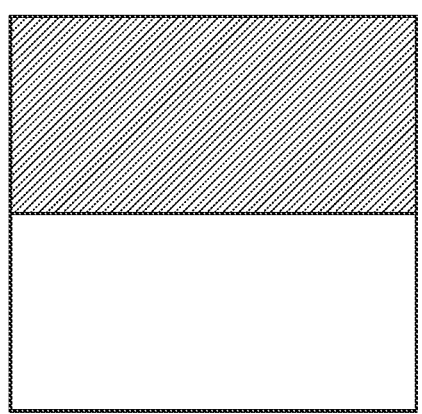

As illustrated in FIG. 25, the smartphone 500 includes a radio communication unit 515, a call unit 516, a storage unit 517, an external input/output unit 518, a GPS (Global Positioning System) reception unit 519, a motion sensor unit 520 and a power supply unit 521, in addition to the display input unit 502, the speaker 503, the microphone 504, the operation unit 505, the camera unit 506, the CPU 507 and the display processing unit 508.

The radio communication unit 515 performs radio communication with respect to a base station device housed in a mobile communication network according to an instruction of the CPU 507. This radio communication is used to transmit and receive email data and various kinds of file data such as voice data and image data, and so on, and receive web data and streaming data, and so on.

The call unit 516 includes the speaker 503 and the microphone 504, converts user's voice input through the microphone 504 into voice data and outputs it to the CPU 507, and decodes voice data received in the radio communication unit 515, and so on, and outputs it from the speaker 503.

For example, the operation unit 505 is a hardware key using a press button switch and a cross key, and so on, and accepts an instruction from the user. For example, this operation unit 505 is mounted to the lower side of the display unit of the chassis 501 or the side surface of the chassis 501.

The storage unit 517 stores a control program and control data of the CPU 507, application software, address data associating the name and telephone number, and so on, of the communication party, and data of transmitted and received email data, and so on, or temporarily stores streaming data, and so on. Moreover, the storage unit 517 is formed with an internal storage unit 517a incorporated in the smartphone and an external storage unit 517b having a detachable external memory slot. Here, various known storage media of a flash memory type and hard disk type, and so on, are used as the internal storage unit 517a and the external storage unit 517b.

The external input/output unit 518 plays a role of an interface with all external devices connected with the smartphone 500 and is provided to directly or indirectly connect with other external devices by communication, and so on.

The GPS reception unit 519 receives GPS signals transmitted from GPS satellites ST1 to STn, performs positioning calculation processing based on the received multiple GPS signals, and detects a position formed with the latitude, longitude and altitude of the smartphone 500. This detection result is output to the CPU 507.

For example, the motion sensor unit 520 includes a three-axis acceleration sensor, and so on, and detects the physical movement of the smartphone 500. By this means, the movement direction and acceleration of the smartphone 500 are detected. This detection result is output to the CPU 507. Moreover, the power supply unit 521 supplies power accumulated in an unillustrated battery to each part of the smartphone 500.

The CPU 507 operates according to the control program and control data read out from the memory unit 517, and integrally controls each part of the smartphone 500. Moreover, the CPU 507 performs display control with respect to the display panel 510 and operation detection control to detect user operation through the operation unit 505 or the operation panel 512, and so on.

By execution of the display control, the CPU 507 displays a software key such as an icon and a scroll bar to activate application software, or displays a window to create email. Here, the scroll bar denotes a software key to accept an instruction to move an image display part of a large image that cannot be settled in the display region of the display panel 510.

Moreover, by execution of operation detection control, the CPU 507 detects user operation through the operation unit 505, accepts operation with respect to the above-mentioned icon or an input of a character string with respect to an input column of the above-mentioned window through the operation panel 512 or accepts a scroll request of a display image through a scroll bar.

In addition, the CPU 507 has a touch panel control function to determine whether an operation position with respect to the operation panel 512 is an overlapping part (display region) that overlaps with the display panel 510 or it is the remaining outer peripheral part (non-display region) that does not overlap with the display panel 510 by execution of operation detection control, and controls the sensing region of the operation panel 512 and the display position of the software key.

Moreover, the CPU 507 can detect gesture operation with respect to the operation panel 512 and execute a preset function according to the detected gesture operation. The gesture operation is not simple touch operation in the related art, and means operation to draw a trajectory by finger and so on, designate multiple positions at the same time or combine these to draw a trajectory of at least one of multiple positions.

Since the camera unit 506 has basically the same configuration as the digital camera of above-mentioned respective embodiments, the effect similar to above-mentioned respective embodiments is acquired. Here, for example, it only has to perform MF operation in the display input unit 502 or the operation unit 505.

What is claimed is:

1. An imaging device comprising:
   a photographing lens;
   an imaging element where multiple pixels including a photoelectric conversion element are two-dimensionally arrayed in a first direction and a second direction perpendicular to the first direction, the multiple pixels including a first pixel and a second pixel in which each object light passing through a first region and a second region of the photographing lens is pupil-divided and respectively enters, and a pair of array patterns including a first array pattern formed by alternately arraying the first and second pixels at first intervals in the first direction and a second array pattern formed by shifting the first array pattern in the first direction by the first interval are repeatedly disposed at second intervals in the second direction;
   a first interpolation device configured to calculate a pixel value of a first interpolation pixel in an intermediate position of a first pixel pair based on a pixel value of the first pixel pair by interpolation processing, assuming that the first pixels of the first and second array patterns disposed in a same pixel line among pixel lines in a third direction and a fourth direction that are inclined to the first and second directions of the imaging element are the first pixel pair;
   a second interpolation device configured to calculate a pixel value of a second interpolation pixel in an intermediate position of a second pixel pair based on a pixel value of the second pixel pair by interpolation processing, assuming that the second pixels of the first and second array patterns disposed in the same pixel line are the second pixel pair;
   a focusing confirmation image generation device configured to generate a first image and a second image respectively based on only the pixel values of the first and second interpolation pixels calculated by the first and second interpolation devices and generating a focusing confirmation image based on the first and second images; and
   a display device configured to display the focusing confirmation image generated by the focusing confirmation image generation device.

2. The imaging device according to claim 1, wherein the second array pattern is disposed by being separated by the first interval in the second direction with respect to the first array pattern.

3. The imaging device according to claim 1, wherein the first region and the second region of the photographing lens are regions symmetrical to a first straight line parallel to the second direction.

4. The imaging device according to claim 3, wherein the focusing confirmation image is an image formed by arranging and disposing the first image and the second image in the second direction.

5. The imaging device according to claim 1, wherein:
   the photographing lens includes a focus lens; and
   a lens movement mechanism to move the focus lens in an optical axis direction of the photographing lens in response to manual focus operation.

6. An imaging device comprising:
   a photographing lens;
   an imaging element where multiple pixels including a photoelectric conversion element are two-dimensionally arrayed in a first direction and a second direction perpendicular to the first direction, the multiple pixels including a first pixel and a second pixel in which each object light passing through a first region and a second region of the photographing lens is pupil-divided and respectively enters, and a pair of array patterns including a first array pattern formed by alternately arraying the first and second pixels at first intervals in the first direction and a second array pattern formed by shifting the first array pattern in the first direction by the first interval are repeatedly disposed at second intervals in the second direction;
   a first interpolation device configured to calculate a pixel value of a first interpolation pixel in an intermediate position of a first pixel pair based on a pixel value of the first pixel pair by interpolation processing, assuming that the first pixels of the first and second array patterns disposed in a same pixel line among pixel lines in a third direction and a fourth direction that are inclined to the first and second directions of the imaging element are the first pixel pair;
   a second interpolation device configured to calculate a pixel value of a second interpolation pixel in an intermediate position of a second pixel pair based on a pixel value of the second pixel pair by interpolation processing, assuming that the second pixels of the first and second array patterns disposed in the same pixel line are the second pixel pair;
   a focusing confirmation image generation device configured to at least generate a first image and a second image respectively from the pixel values of the first and second interpolation pixels calculated by the first and second interpolation device and generating a focusing confirmation image based on the first and second images; and
a display device configured to display the focusing confirmation image generated by the focusing confirmation image generation device,
wherein the multiple pixels include the first and second pixels and a third pixel in which each object light passing through the first and second regions respectively enters without pupil division, further comprising:
a third image generation device configured to generate a third image based on a pixel value of the third pixel; and
a display control device configured to cause the display device to display the third image generated by the third image generation device and display the focusing confirmation image in a display region of the third image,
a third interpolation device configured to decide a pixel value of a third interpolation pixel located between the first pixels of the first and second array patterns, based on pixel values of these first pixels, and deciding a pixel value of a fourth interpolation pixel located between the second pixels, based on pixel values of these second pixels;
a fourth interpolation device configured to decide a pixel value of a fifth interpolation pixel located between the first pixels of one of the first and second array patterns, based on pixel values of the first pixels disposed in a same pixel line in the second direction as the fifth interpolation pixel, and deciding a pixel value of a sixth interpolation pixel located between the second pixels of the one of the first and second array patterns, based on pixel values of the second pixels disposed in a same pixel line in the second direction as the sixth interpolation pixel;
a determination device configured to determine a direction with high correlation of the third pixel and intensity of the correlation, based on the pixel value of the third pixel; and
an interpolation control device configured to select what corresponds to the determination result from the first and second interpolation devices, the third interpolation device and the fourth interpolation device, to cause interpolation processing to be performed based on the determination result of the determination device.

7. An imaging device comprising:
a photographing lens;
an imaging element where multiple pixels including a photoelectric conversion element are two-dimensionally arrayed in a first direction and a second direction perpendicular to the first direction, the multiple pixels including a first pixel and a second pixel in which each object light passing through a first region and a second region of the photographing lens is pupil-divided and respectively enters, and a pair of array patterns including a first array pattern formed by alternately arraying the first and second pixels at first intervals in the first direction and a second array pattern formed by shifting the first array pattern in the first direction by the first interval are repeatedly disposed at second intervals in the second direction;
a first interpolation device configured to calculate a pixel value of a first interpolation pixel in an intermediate position of a first pixel pair based on a pixel value of the first pixel pair by interpolation processing, assuming the first pixels of the first and second array patterns disposed in a same pixel line among pixel lines in a third direction and a fourth direction that are inclined to the first and second directions of the imaging element are the first pixel pair;
a second interpolation device configured to calculate a pixel value of a second interpolation pixel in an intermediate position of a second pixel pair based on a pixel value of the second pixel pair by interpolation processing, assuming the second pixels of the first and second array patterns disposed in the same pixel line are the second pixel pair;
a focusing confirmation image generation device configured to at least generate a first image and a second image respectively from the pixel values of the first and second interpolation pixels calculated by the first and second interpolation device and generating a focusing confirmation image based on the first and second images;
a display device configured to display the focusing confirmation image generated by the focusing confirmation image generation device, and
a defect pixel detection device configured to detect a defect pixel included in the multiple pixels, wherein:
when one of the first pixel pair is the defect pixel, the first interpolation device decides a pixel value of the other of the first pixel pair as a pixel value of the first interpolation pixel based on a detection result of the defect pixel detection device; and
when one of the second pixel pair is the defect pixel, the second interpolation device decides a pixel value of the other of the second pixel pair as a pixel value of the first interpolation pixel based on the detection result of the defect pixel detection device.

8. The imaging device according to claim 7, wherein:
based on the detection result of the defect pixel detection device, when both of the first pixel pair disposed in an N-th (N is a natural number equal to or greater than 2) place along the first direction are the defect pixel, the first interpolation device calculates pixel values of the first interpolation pixels respectively corresponding to the first pixel pairs of a (N−1)-th place and a (N+1)-th place, and decides an average value of the pixel values of these first interpolation pixels as a pixel value of the first interpolation pixel corresponding to the first pixel pair of the N-th place; and
based on the detection result of the defect pixel detection device, when both of the second pixel pair disposed in the N-th place are the defect pixel, the second interpolation device calculates pixel values of the second interpolation pixels respectively corresponding to the second pixel pairs of the (N−1)-th place and the (N+1)-th place, and decides an average value of the pixel values of these second interpolation pixels as a pixel value of the second interpolation pixel corresponding to the second pixel pair of the N-th place.

9. A control method of an imaging device comprising a photographing lens and an imaging element where multiple pixels including a photoelectric conversion element are two-dimensionally arrayed in a first direction and a second direction perpendicular to the first direction, the multiple pixels including a first pixel and a second pixel in which each object light passing through a first region and a second region of the photographing lens is pupil-divided and respectively enters, and a pair of array patterns including a first array pattern formed by alternately arraying the first and second pixels at first intervals in the first direction and a second array pattern formed by shifting the first array pattern in the first direction by the first interval are repeatedly disposed at second intervals in the second direction, the method comprising:

a first interpolation step of calculating a pixel value of a first interpolation pixel in an intermediate position of a first pixel pair based on a pixel value of the first pixel pair by interpolation processing when the first pixels of the first and second array patterns disposed in a same pixel line among pixel lines in a third direction and a fourth direction that are inclined to the first and second directions of the imaging element are assumed to be the first pixel pair;

a second interpolation step of calculating a pixel value of a second interpolation pixel in an intermediate position of a second pixel pair based on a pixel value of the second pixel pair by interpolation processing when the second pixels of the first and second array patterns disposed in the same pixel line are assumed to be the second pixel pair;

a focusing confirmation image generation step of generating a first image and a second image respectively based on only the pixel values of the first and second interpolation pixels calculated in the first and second interpolation steps and generating a focusing confirmation image based on the first and second images; and a display step of displaying the focusing confirmation image generated in the focusing confirmation image generation step.

10. A control method of an imaging device comprising a photographing lens and an imaging element where multiple pixels including a photoelectric conversion element are two-dimensionally arrayed in a first direction and a second direction perpendicular to the first direction, the multiple pixels including a first pixel and a second pixel in which each object light passing through a first region and a second region of the photographing lens is pupil-divided and respectively enters, and a pair of array patterns including a first array pattern formed by alternately arraying the first and second pixels at first intervals in the first direction and a second array pattern formed by shifting the first array pattern in the first direction by the first interval are repeatedly disposed at second intervals in the second direction, the method comprising:

a first interpolation step of calculating a pixel value of a first interpolation pixel in an intermediate position of a first pixel pair based on a pixel value of the first pixel pair by interpolation processing when the first pixels of the first and second array patterns disposed in a same pixel line among pixel lines in a third direction and a fourth direction that are inclined to the first and second directions of the imaging element are assumed to be the first pixel pair;

a second interpolation step of calculating a pixel value of a second interpolation pixel in an intermediate position of a second pixel pair based on a pixel value of the second pixel pair by interpolation processing when the second pixels of the first and second array patterns disposed in the same pixel line are assumed to be the second pixel pair;

a focusing confirmation image generation step of at least generating a first image and a second image respectively from the pixel values of the first and second interpolation pixels calculated in the first and second interpolation steps and generating a focusing confirmation image based on the first and second images; and a display step of displaying the focusing confirmation image generated in the focusing confirmation image generation step, wherein the multiple pixels include the first and second pixels and a third pixel in which each object light passing through the first and second regions respectively enters without pupil division, further comprising:

a third image generation step of generating a third image based on a pixel value of the third pixel a display control step of causing a display device to display the third image generated by the third image generation step and display the focusing confirmation image in a display region of the third image, a third interpolation step of deciding a pixel value of a third interpolation pixel located between the first pixels of the first and second array patterns, based on pixel values of these first pixels, and deciding a pixel value of a fourth interpolation pixel located between the second pixels, based on pixel values of these second pixels;

a fourth interpolation step of deciding a pixel value of a fifth interpolation pixel located between the first pixels of one of the first and second array patterns, based on pixel values of the first pixels disposed in a same pixel line in the second direction as the fifth interpolation pixel, and deciding a pixel value of a sixth interpolation pixel located between the second pixels of the one of the first and second array patterns, based on pixel values of the second pixels disposed in a same pixel line in the second direction as the sixth interpolation pixel;

a determination step of determining a direction with high correlation of the third pixel and intensity of the correlation, based on the pixel value of the third pixel; and an interpolation control step of selecting what corresponds to the determination result from the first and second interpolation steps, the third interpolation step and the fourth interpolation step, to cause interpolation processing to be performed based on the determination result of the determination step.

11. A control method of an imaging device comprising a photographing lens and an imaging element where multiple pixels including a photoelectric conversion element are two-dimensionally arrayed in a first direction and a second direction perpendicular to the first direction, the multiple pixels including a first pixel and a second pixel in which each object light passing through a first region and a second region of the photographing lens is pupil-divided and respectively enters, and a pair of array patterns including a first array pattern formed by alternately arraying the first and second pixels at first intervals in the first direction and a second array pattern formed by shifting the first array pattern in the first direction by the first interval are repeatedly disposed at second intervals in the second direction, the method comprising:

a first interpolation step of calculating a pixel value of a first interpolation pixel in an intermediate position of a first pixel pair based on a pixel value of the first pixel pair by interpolation processing when the first pixels of the first and second array patterns disposed in a same pixel line among pixel lines in a third direction and a fourth direction that are inclined to the first and second directions of the imaging element are assumed to be the first pixel pair;

a second interpolation step of calculating a pixel value of a second interpolation pixel in an intermediate position of a second pixel pair based on a pixel value of the second pixel pair by interpolation processing when the second pixels of the first and second array patterns disposed in the same pixel line are assumed to be the second pixel pair;

a focusing confirmation image generation step of at least generating a first image and a second image respectively from the pixel values of the first and second interpolation pixels calculated in the first and second interpolation steps and generating a focusing confirmation image based on the first and second images;

a display step of displaying the focusing confirmation image generated in the focusing confirmation image generation step; and a defect pixel detection step of detecting a defect pixel included in the multiple pixels, wherein:

when one of the first pixel pair is the defect pixel, the first interpolation step decides a pixel value of the other of the first pixel pair as a pixel value of the first interpolation pixel based on a detection result of the defect pixel detection step; and when one of the second pixel pair is the defect pixel, the second interpolation step decides a pixel value of the other of the second pixel pair as a pixel value of the first interpolation pixel based on the detection result of the defect pixel detection step.

\* \* \* \* \*